United States Patent [19]
Irie

[11] Patent Number: 5,820,886
[45] Date of Patent: Oct. 13, 1998

[54] TIRE VULCANIZING MOLD ASSEMBLY

[75] Inventor: Nobuhiko Irie, Nagasaki, Japan

[73] Assignee: Mitsubishi Jukogyo Kabushiki Kaisha, Tokyo, Japan

[21] Appl. No.: 858,464

[22] Filed: May 19, 1997

Related U.S. Application Data

[63] Continuation of Ser. No. 552,493, Nov. 9, 1995, abandoned.

[30] Foreign Application Priority Data

Nov. 16, 1994 [JP] Japan .................................... 6-281630

[51] Int. Cl.⁶ .................................................. B29C 33/20
[52] U.S. Cl. ........................................... 425/47; 425/28.1
[58] Field of Search ................................. 425/28.1, 34.3, 425/35, 47

[56] References Cited

U.S. PATENT DOCUMENTS

| | | |
|---|---|---|
| 2,285,389 | 6/1942 | Bostwick . |
| 3,730,658 | 5/1973 | Marra ......................................... 425/47 |
| 3,852,006 | 12/1974 | Irie ............................................ 425/47 |
| 3,918,861 | 11/1975 | Klose . |
| 4,013,389 | 3/1977 | MacMillan ................................ 425/47 |
| 4,383,808 | 5/1983 | Kubo et al. ................................ 425/47 |
| 4,453,902 | 6/1984 | Imbert .................................... 425/28.1 |
| 4,563,139 | 1/1986 | Yokoyama et al. ........................ 425/47 |
| 4,813,861 | 3/1989 | Hasegawa et al. ........................ 425/47 |
| 4,927,344 | 5/1990 | Amano et al. ............................. 425/47 |
| 5,194,267 | 3/1993 | Funakoshi et al. ....................... 425/47 |
| 5,271,727 | 12/1993 | Irie ............................................ 425/38 |

FOREIGN PATENT DOCUMENTS

| | | |
|---|---|---|
| 115431 | 8/1984 | European Pat. Off. . |
| 1314771 | 4/1963 | France . |
| 2182698 | 12/1973 | France . |
| 2226272 | 11/1974 | France . |
| 2204306 | 8/1973 | Germany . |
| 7-80846 | 3/1995 | Japan . |
| 7-100834 | 4/1995 | Japan . |
| 1293618 | 10/1982 | United Kingdom . |

Primary Examiner—James P. Mackey
Attorney, Agent, or Firm—Wenderoth, Lind & Ponack, L.L.P.

[57] ABSTRACT

A tire vulcanizing mold assembly includes an upper flange disposed on an outer peripheral portion of an upper mold of a tire vulcanizing mold or an upper flange disposed in the outer peripheral portion of a plate into which the upper mold is assembled, a lower flange disposed in an outer peripheral portion of a plate into which a lower mold is assembled so as to go up and down, and a lock ring which is rotatably assembled into one of the respective flanges and detachably engaged to the other flange, wherein one end portion of a pressurizing unit is detachably engaged to the plate, an output shaft is engaged onto the other end portion of the pressurizing unit so as to abut against the lower mold through the plate portion, and when the tire vulcanizing mold is closed so that the respective flange portions are coupled to each other by the lock ring, a mold opening force due to the inner pressure of the tire vulcanizing mold is prevented.

9 Claims, 29 Drawing Sheets

TIRE VULCANIZING MOLD ASSEMBLY

This application is a continuation of now abandoned application, Ser. No. 08/552,493, filed Nov. 9, 1995.

BACKGROUND OF THE INVENTION

1. Field of the Invention

The present invention relates to a tire vulcanizing mold assembly.

2. Description of the Related Art

This applicant has already proposed: (1) a tire vulcanizer which includes a vulcanizing station where plural sets of tire vulcanizing molds are arranged to perform vulcanization, a mold opening/closing station where after the tire vulcanizing mold is opened, a vulcanized tire is taken out therefrom, and then an unvulcanized tire to be succeedingly vulcanized is inserted into the mold so as to be shaped before the tire vulcanizing station is closed, and a mold carrier truck which reciprocates between the vulcanizing station and the mold opening/closing station (refer to Japanese Patent Application No. Hei 5-228961); (2) a tire vulcanization split mold unit that is a tire vulcanizing mold used in the vulcanizer, which requires no mold fastening force during vulcanization by self-locking an internal pressure reaction force within the mold (Japanese Patent Application No. Hei 6-122661); and (3) a tire vulcanizer of a type in which plural pairs of tire vulcanizing molds are held in a fixed state, and a commonly used mold opening/closing unit which conducts the opening/closing operation of the plural sets of molds, etc., is moved relative to the mold group (refer to Japanese Patent Application No. Hei 5-244658).

Now, the tire vulcanizer of the above item (1) will be described with reference to FIGS. 12 to 22.

FIG. 12 is a plan view showing one example of a tire vulcanizer.

FIG. 13 is a vertical cross-sectional front view showing the tire vulcanizer taken along a line 13—13 in FIG. 12;

FIG. 14 is a plan view showing another example of the tire vulcanizer.

FIG. 15 is a vertical cross-sectional front view showing the tire vulcanizer taken along a line 15—15" in FIG. 14.

FIG. 16 is a vertical cross-sectional front view showing the tire vulcanizer taken along a line 16—16 in FIG. 12.

FIG. 17 is a vertical cross-sectional side view showing the tire vulcanizer taken along a line 17—17 in FIG. 16.

FIG. 18 is a horizontal cross-sectional plan view showing one example of upper-heating-plate detachably engaging means taken along a line 18—18 in FIG. 17.

FIG. 19 is a horizontal cross-sectional plan view showing a coupling state of the upper-heating-plate detachably engaging means taken along a line 18—18 in FIG. 17.

FIG. 20 is an enlarged vertical cross-sectional side view showing the tire vulcanizer indicated by an arrow g.

FIG. 21 is a horizontal cross-sectional side view showing the tire vulcanize r taken along a line 21—21 in FIG. 20.

FIG. 22 is a horizontal cross-sectional plan view showing the tire vulcanizer taken along a line 22—22 in FIG. 20.

First, the whole tire vulcanizer will be described with reference to FIGS. 12 and 13. vulcanizing stations 1' (1a' and 1b') include a plurality of mold tables 5' (5a', 5b', 5c', . . . ) on which a plurality of tire molds M (Ma, Mb, Mc, . . . ) are mounted. Each of the mold tables 5' is equipped with m old moving means (for example, a cylinder-driven pusher) not shown, and as occasion demands, heated and pressurized medium supplement means, a piping or the like.

Mold opening/closing stations 2' (2a' and 2b') include mold opening/closing units 6' (6a' and 6b') which are similar to a known tire vulcanizer, a known unloader 7a' which takes out a vulcanized tire from the tire mold, and a known loader 8a which takes an unvulcanized tire into the tire mold. As occasion demands, the mold opening/closing stations 2' are equipped with a vulcanize d tire carrier conveyor 9a', an unvulcanized tire rack 10a' or the like.

A mold carrier truck is comprised of rails 4' fixed to a floor, and known trucks 3' (3a' and 3b') which are guided by the rails 4' and travel by the operation of drive means (not shown). The foregoing mold exchange station 2' is comprised of a mold exchange table 11' which performs the exchange of a tread mold, a side wall mold or the like within the tire mold in accordance with a change in the specification of a tire to be vulcanized, the exchange of a bladder which is a consumable goods, and so on. The mold exchange table 11' has a mold opening/closing sequence necessary for those exchange works.

Subsequently, the foregoing mold M will be described in more detail with reference to FIGS. 16 to 22. The left side of the tire vulcanizer with respect to a line d—d in FIG. 16 shows a state in which the tire mold M has been opened and the vulcanized tire has been taken out, whereas the right side thereof shows a state in which the tire mold has been closed after an unvulcanized tire T has been taken into the tire mold, and a heated and pressurized medium has then been introduced into the interior of the tire T through a bladder B to start vulcanization.

Reference numeral 301 denotes a substrate of a tire mold M, which is mounted on a frame 6e' of the mold opening/closing unit 6a' through ball casters 302' which are embedded in the lower surface of the substrate 301, so as to be horizontally slidable thereon, and fixed to the frame 6e' through a known lock unit (not shown).

A lower heating plate 303 is fixed onto a bush 308 which has been inserted into a cylinder 301a formed in the central portion of the substrate 301 so as to be slidable vertically while being guided by the outer peripheral surface of the cylinder 301a. A rod of a cylinder 6f fixed onto the frame 6e' penetrates a hole 301e which is defined in the substrate 301. The lower heating plate 303 goes up and down with the vertical movement of that rod.

Reference numeral 305 denotes a lower side wall mold fastened onto the lower heating plate 303 by bolts, and 306 is a lower bead ring which is assembled in the bush 308 through a known bayonet lock mechanism. The lower portion of the bladder B is nipped between a bladder presser 307 which is fastened onto the lower bead ring 306 by bolts and the lower bead ring 306.

Reference numeral 309 denotes a tread mold which is divided into a plurality of pieces in the peripheral direction. The tread mold 309 is fastened by bolts onto the inner peripheral surface of a plurality of segments 310 an outer peripheral surface of which forms a practical conical surface when the tread mold 309 is closed. An outer ring 311 having a conical surface which is engaged with the outer peripheral surface of the segments 310 in the circumference thereof is fastened onto the substrate 301 through a spacer 312. A T-bar 310a, which is slidably engaged with a T-groove 310a formed vertically on the conical outer peripheral surface of the segments 310, is fixed onto the conical peripheral surface of the outer ring 311. When the lower heating plate 303 goes up with the operation of the foregoing cylinder 6f, the segments 310 are pushed up through a pressure plate 304 which is fixed onto the lower heating plate 303, and it also slides outwardly in a radial direction thereof while being guided by the T-bar 311a so that the tread mold 309 is relatively away from the lower side wall mold 305 outwardly in the radial direction.

Simultaneously, a claw 310b formed below the segments 310 is relatively moved outwardly in the radial direction with respect to a claw 303a formed in the outer periphery of the lower heating plate 303, which is engaged therewith when the mold is closed to thereby release the engagement.

When the tire mold M is closed, the upper heating plate 314 onto which the pressure plate 315 is fitted is mounted on the segments 310 through the pressure plate 315, and the claw 314a formed on the upper heating plate 314 and the claw 314a formed on the upper portion of the segments 310 are engaged with each other or released from engagement through the slide of the segments 314 in the radial direction.

Reference numeral 313 denotes an upper side wall mold which is fastened onto the upper heating plate 314 by bolts; and 316 is an upper bead ring which is fastened onto the upper side wall mold 313 by bolts.

It should be noted that an arm 6c' which is assembled in the frame 6e so as to go up and down is fixed with a top of the rod of the cylinder 6d' which is fixed onto the frame 6e, and the arm 6c' goes up and down with the operation of the cylinder 6d.

Also, known detachably engaging means 6k' which enables the upper heating plate 314 to be detachably engaged to the arm 6c', that is, means which is allowed to be engaged with the claw 314b integrated with the upper heating plate 314 or passible by fixing a rotary cylinder 324 onto the other end of a T-rod 325 which is assembled in a T-shaped claw 325a at a top thereof and by reciprocatingly rotating the T-rod 325 by 90 degrees with the operation of the rotary cylinder 324, is assembled in the arm 6c. When the cylinder 6d' is actuated while the detachably engaging means 6k couples the arm 6c to the upper heating plate 314 and the segments 310 also move outwardly in the radial direction to release the engagement of the claws 310c and 314a, the upper side wall mold 313 and the upper bead ring 316 go up and down together with the upper heating plate 314.

Also, a second center post 321 is inserted so as to slidably go up and down while being guided by the inner peripheral surface of the bush 320 which is fastened onto the upper end portion of a cylindrical portion 301a of the substrate 301 by bolts. Further, a first center post 323 is inserted so as to slidably go up and down while being guided by the inner peripheral surface of a bush 322 which is fastened onto the upper end portion of the second center post 321 by bolts. The first center post 323 goes up and down through the engagement of an extension rod 6j' screwed with the top of the rod of a center post elevating cylinder (not shown) which is fixed onto the frame 6e' as well as a claw 6i' formed on the upper end of the cylinder 6b which is rotatably assembled in the extension rod 6j' with a claw 323c formed on the lower end of the first center post 323.

The first center post 323 goes up until the flange 323b formed on the lower portion of the first center post 323 a buts against a ring-shaped projection 321b which is formed within a portion of the second center post 321 which is in the vicinity of the upper end thereof. Then, the second center post 321 goes up so that the flange 321a formed on the lower end of the second center post 321 abuts against a ring-shaped projection 301c which is formed within a portion of the cylinder 301a which is in the vicinity of an upper end thereof. As a result, the first and second center posts 321 and 323 stop lifting up. At the time of going down, the outer peripheral end portion of the bush 322 abuts against the bush 320 so that the second center post 321 stops going down. The flange 318 which is fastened to the upper end of the first center post 323 by bolts abuts against the bush 322 so that the first center post 323 also stops going down.

The upper end portion of the bladder B is nipped between the flange 318 and a bladder presser 317 fastened on the flange 318 by bolts, and the going up and down of the center post 323 allows the upper and lower ends of the bladder B to be away from or approach each other in distance.

Also, the cylindrical portion 301a of the substrate 301 is equipped with a passage 301b for supplying or exhausting the heated and pressurized medium to or from the interior of the tire T through the bladder B. The lower end of the passage 301b is detachably engaged to a piping 6g of the mold opening/closing unit 6 through a known detachably engaging means 326.

That is, the detachably engaging means 326 is comprised of a check valve and the piping 6g. The check valve consists of a valve body 227 fixedly embedded in the substrate 301, a valve 328 which slides on one inner peripheral surface 327b of the valve body 327 as a guide and has a seat surface 327a that is engaged with a seat 327a formed in the middle of the valve body 327, and a coil spring 329 pushing the valve 328 onto the seat 327a. The piping 6g has a cylindrical surface which is slidably engaged with the other inner peripheral surface 327c of the valve body 327 in the outer periphery of a top thereof. A Y-shaped body which abuts against a valve spindle 328c of the valve 328, extending toward the side of the seat surface 327a is formed in the top of the piping 6g. When the piping 6g is inserted into the valve body 327, the valve 328 is pushed up so that the passage 301b communicates with the piping 6g. When the piping 6g is lowered, the valve 328 is pushed down by the coil spring 329 in such a manner that the passage 301b is closed. It should be noted that a changeover valve (not shown) and so on are assembled between the piping 6g and a heated and pressurized medium supply source.

Also, the first center post 323 is equipped with a passage 323a for introducing a vapor for shaping and so on into the interior of the tire T through the bladder B. Similarly, a detachably engaging means like the above is assembled under the passage 323a.

As is apparent from the foregoing description, the mold opening/closing unit 6 is substantially identical with the conventional tire vulcanizer except that there is no pressurizing means which fastens the tire mold so that the tire mold is prevented from opening against a force which allows the tire mold to be opened by the pressure of the heated and pressurized medium, and there is provided the foregoing detachably engaging means.

The operation of one example of the foregoing tire vulcanizer will be described below.

FIG. 12 shows a state in which the vulcanization of a tire within the tire mold Ma which has been mounted on the mold table 5a' in the vulcanizing station 1a' has been finished, and the mold carrier truck 3a' has finished taking it into the mold opening/closing unit 6a' of the mold opening/closing station 2a'.

In this state, the cylinder 6d' is first actuated to go the arm down so that the detachably engaging means 6k' allows the upper heating plate 314 of the tire mold Ma to be coupled to the arm 6c'. Simultaneously, the piping 6g' is lifted up so as to communicate with the passage 301b. The extension rod 6j' is lifted up a little bit so as to also communicate with the passage 323a, and the cylinder 6h' is rotated in such a manner that the claws 6j' and 323c are engaged with each other.

Subsequently, the changeover valve (not shown) is actuated to exhaust the heated and pressurized medium within the tire T. After it has been confirmed that the inner pressure within the tire T is satisfactorily lowered, the cylinder 6f is actuated to push up the lower heating plate 303. With this push-up operation, the tread mold 309 is away relatively from the tire T to perform the mold release. After the tread mold 309 is sufficiently enlarged in diameter in such a manner that the engagement of the claws 310b and 310c of the segment 310 with the claws 303a and 314a of the upper and lower heating plates is released, the cylinder 6d' is actuated to make the upper heating plate 314 go up, thereby performing the mold release of the upper side wall mold 313. While the interior of the bladder B is made vacuous through the passage 323a, the center post 323 is allowed to go up so that the bladder B is drawn out from the interior of the tire T.

Subsequently, the unloader 7a' operates to make the vulcanized tire T hung out to the exterior of the tire mold Ma, and the loader 8a' operates to make an unvulcanized tire T to be succeedingly vulcanized hung into the tire mold Ma. While vapor for shaping is supplied into the bladder B through the passage 323a, the center post 323 is allowed to go down. Then, after the bladder B has been inserted into the interior of the unvulcanized tire T which has been hung into the mold, the loader 8a' releases the gripping of the tire T and is then moved to a stand-by position. After the loader 8a has been moved to a position where it does not interfere with the upper heating plate 314, the cylinder 6d' is actuated to make the upper heating plate 314 go down, thereby performing shaping and tire mold closing processes in a known procedure. After the upper heating plate 314 abuts against the segment 310, the cylinder 6f is also actuated to make the upper heating plate 314 push down the lower heating plate 303 through the segment 310. With this push-down operation, the tread mold 309 is reduced in diameter whereby the tire mold Ma is closed.

In this situation, the engagement of the claw 310c with the claw 314a as well as the engagement of the claw 303a with the claw 310b is conducted simultaneously. Therefore, after the tire mold Ma has been closed, the heated and pressurized medium is introduced into the interior of the tire T through the bladder B to thereby start the vulcanization. Even in such a situation, a force which is exerted to open the mold as a result of a pressure of the heated and pressurized medium is offset through the segments 310 with the engagement of the claws 310c and 314a, and the claws 303a and 310b. As a result, the mold is not allowed to open.

Then, after the vulcanization of the tire starts, the coupling of the tire mold Ma to the mold opening/closing unit 6a' is released in a procedure reverse to the foregoing procedure. In this situation, since the check valves are assembled in the lower end portions of the passages 323a and 301b, the inside pressure in the tire is held.

Subsequently, the tire mold Ma is transported onto the mold table 5a' of the vulcanizing station 1a' by the mold carrier truck 3a', and the vulcanization is continued. The mold carrier truck 3a' then receives the tire mold by which vulcanization has been finished and transports that mold to the mold opening/closing station 2a'.

It should be noted that in the case of conducting the exchange of the bladder B and so on, after the mold is closed once without hanging the tire T to be succeedingly vulcanized into the mold (in this case, it goes without saying that the heated and pressurized medium is also not introduced), the tire T is transported to the mold exchange station 11'. While the bladder B, etc. are exchanged, the tire is taken in or taken out from another tire mold in the mold carrier truck 3a' and the mold opening/closing station 6a'. After the exchange of the bladder B, etc. has been finished, the mold is carried to the mold opening/closing station so that a tire to be succeedingly vulcanized is inserted into the mold.

First, another example of the whole tire vulcanizer will be described with reference to FIGS. 14 to 22. It should be noted that the parts having the same function are represented by the same reference mark, and only parts different from those of the foregoing example will be described.

Vulcanizing stations 12' (12a' and 12b') shown in FIG. 14 are comprised of a plurality of mold tables 5' (5a', 5b', 5c'. . . ) on which a plurality of tire molds M (Ma, Mb, Mc, . . . ) are mounted, and a frame 14' with which the plurality of mold tables 5' are assembled. Each of the mold tables 5' is equipped with mold moving means not shown (for example, a cylinder-driven pusher), and as occasion demands, heated and pressurized medium supplement means, a piping or the like. The arrangement of the mold opening/closing stations 6' (6a' and 6b') with respect to the vulcanizing station 12' is different from that in the foregoing example, but identical in construction and operation with the foregoing example.

A mold carrier truck is comprised of rails 4' fixed onto a floor, and known trucks 13' (13a' and 13b') which are guided by the rails 4' and travel by the operation of drive means (not shown). This structure is identical with that of the foregoing example, but the tire mold M can be loaded on 2 areas. Further, the load surfaces can go up and down, and the mold table 5' at the lower side when going down and the mold table 5' at the upper side when going up are identical in level with the tire mold loaded area. This structure is different from that of the foregoing example.

FIG. 15 shows a state in which after the mold Ma by which the vulcanization of a tire has been finished in the mold table 5a' has been transported to the mold opening/closing station 2a', the take-in and take-out of the tire have been finished, the mold Mb by which the vulcanization of a tire has been finished in the mold table 5b' is loaded on one load position of the mold carrier truck 13a', and an empty load position is moved in front of the mold opening/closing unit 6a', thereby coming to a stop state.

In this state, after the tire mold Ma, which finished the take-out and take-in of the tire is first moved to the empty load position of the mold carrier truck 13a' by drive means (not shown), the foregoing truck 13a' is moved and stopped so that the tire mold Mb comes in front of the mold opening/closing unit 6a'. Then, the tire mold Mb is supplied into the interior of the mold opening/closing unit 6a. The vulcanized tire T is taken out from the tire mold Mb in the foregoing sequence, and then an unvulcanized tire T to be subsequently vulcanized hangs in the tire mold Mb. While the shaping and mold closing processes are being conducted, the tire mold Ma is transported onto the mold table 5a' by the truck 3a'. The truck 13a' is loaded with a tire mold (for example, Mc) by which the vulcanization has subsequently been finished at a predetermined position (a position where Mb is mounted in FIG. 3) on the foregoing truck 13a' before being returned back.

Subsequently, the tire vulcanizer split mold unit of the foregoing item (2) will be described with reference to FIGS. 23 to 27.

FIG. 23 is a plan view showing a tire vulcanizer to which the tire vulcanizer split mold unit is applied.

FIG. 24 is a side view showing the tire vulcanizer taken along a line 24—24 in FIG. 23.

FIG. 25 is a vertical cross-sectional front view showing the above tire vulcanizer split mold unit taken along a line 25—25 in FIG. 24.

FIG. 26 is a vertical cross-sectional front view showing one example of the above tire vulcanizer split mold unit and the mold opening/closing unit, taken along a line 25—25 in FIG. 24.

FIG. 27 is a vertical cross-sectional front view showing another example of the above tire vulcanizer split mold unit and the mold opening/closing unit, taken along a line 25—25 in FIG. 24.

It should be noted that FIGS. 23 and 24 are substantially identical to the foregoing tire vulcanizer shown in FIGS. 12 and 13.

Now, the tire vulcanizer split mold unit will be described with reference to FIGS. 25 to 27. It should be noted that FIG. 25 shows a state in which an unvulcanized tire T has been taken in, the tire vulcanization mold has been closed, and a heated and pressurized medium has been introduced into the interior of the tire T through the bladder B, thereby starting vulcanization.

Reference numeral 401 denotes a substrate of the tire vulcanizing mold M, and the substrate 401 is horizontally slidably mounted on a frame 6e' of a mold opening/closing unit 6a' and is fixed onto the frame 6e' by a known lock unit (not shown).

Reference numeral 403 denotes a lower disc which is fixed onto the substrate 401 through a hard heat-insulating material 402 (in this example, a heated and pressurized medium passage is provided and serves as a heating plate) ; 405, a lower side wall mold which is fixed onto the lower disc 403; 406, a lower bead ring having an outer peripheral surface which is engaged with the circumferential cylindrical surface of the lower side wall mold 405, which is detachably assembled in a flange 420a formed in the central outer periphery of the cylindrical body 420 by means of a damper 408. The lower portion of the bladder B is nipped between the bladder presser 407 which is fastened to the lower bead ring 406 by bolts and the lower bead ring 406.

Reference numeral 409 denotes a tread mold which is divided into a plurality of pieces in the peripheral direction. The tread mold 409 is fastened by bolts onto the inner peripheral surface of segments 410 the outer peripheral surface of which forms a practical conical surface when the tread mold 409 is closed. The segments 410 is slidable on a pressure plate 404 fixed onto a flange 403b which is formed on the outer peripheral portion of the lower disc 403.

Reference numeral 411 denotes an outer ring having inner periphery thereof a conical surface which is engaged with the outer peripheral surface of the segments 410. A T-bar 411a, which is slidably engaged with a T-groove 410a formed vertically in the conical outer peripheral surface of the segments 410, is fixed onto the conical inner peripheral surface of the outer ring 411. A slide guide 415 which is assembled in a plurality of arms 414a extending from the outer peripheral portion of the upper disc 414 in a radial direction thereof so as to be slidable in the radial direction is fixed onto the upper surface of the segment 410. When the upper disc 414 and the outer ring 411 go up and down relatively in the axial direction, the tread mold 409 is moved in the radial direction through the segments 410 so as to be expanded and reduced. When the tread mold 409 is closed, claws 410b and 410c formed on the upper and lower end portions of the segments 410 are engaged with claws 414b and 403b formed in the outer peripheral portions of the upper disc 414 and the lower disc 403. When the tread mold is opened, the engagements of the claws 410b and 410c, the claws 410c and 403a are released.

Reference numeral 413 denotes an upper side wall fastened onto the upper disc 414 (in this example, it also serves as a heating plate with the provision of a heated and pressurized medium passage), and 416 denotes an upper bead ring fastened onto the upper side wall 413 by bolts.

Reference numeral 421 denotes a center post which is vertically slidably inserted into the foregoing cylindrical body 420 and 422 denotes; bush which is integrally engaged onto the lower end portion of the center post 421 and has an outer peripheral surface slid on the inner peripheral surface of the cylindrical body 420. Reference numeral 423 denotes a packing which is inserted into the upper end of the cylindrical body 420 and has an inner peripheral surface slid on the center post 421; and 424 denotes a stopper for the packing 423. An automatic coupling means, which is assembled into the top of the rod of the center post elevation cylinder (not shown), is pressed and inserted into a concave portion 421a formed in the lower end portion of the center post 421. A cap 425 is fixed onto the upper end portion of the center post 421 through a pin 426.

Reference numeral 418 denotes a flange which is fastened on the cap 425 by bolts, and 417 denotes a bladder presser which is fastened on the flange 418 by bolts. The upper end of the bladder B is nipped between the outer peripheral portion of the flange 418 and the bladder presser 417. Both ends of the bladder B are away from or approach each other in accordance with the actuation of the foregoing center post elevation cylinder.

It should be noted that a nozzle ring 427 having a plurality of nozzles 427a which introduce a heated and pressurized medium into the interior of the tire T through the bladder B is fixed onto the above cylindrical body 420. The cylindrical body 420 is formed with a heated and pressurized medium passage 420c and a heated and pressurized medium exhaust passage 420d which communicate with the nozzle 427a. Quick couplers 428 and 429 with a check valve, which connect those passages 420c and 420d to an external piping of the mold unit, are assembled in the outlet portions of those passages 420c and 420d.

Reference numeral 430 denotes a cover plate the outer peripheral portion of which is fastened onto the outer ring 411 through a spacer ring 412 and a hard heat-insulating material 431 by bolts. Reference numeral 432 denotes a spacer which is fixed onto the upper disc 414, and 419a, 419b and 419c are soft heat insulating materials.

Locking means for the upper disc 414 and the cover plate 430 is comprised of an inner ring 438 fastened onto the upper disc 414 by bolts, an outer ring 434 rotatably assembled in the inner periphery of the cover plate 430 through the bush 433, plural pairs of claws 434a and 438a which are formed in the inner periphery of the outer ring 414 and the outer periphery of the inner ring 438 and are engageable or can pass in the axial direction thereof in accordance with a rotating angle of the outer ring 414, and a swinging unit which will be described later.

It should be noted that reference numeral 436 denotes a stopper fixed to the outer ring 434.

Reference numeral 440 shown in FIGS. 26 and 27 denotes a bolster plate fixed onto an arm 6c' which is assembled in a column of the mold opening/closing unit 6a' so as to be movable up and down (slidable), and moves up and down by the operation of the elevation cylinder 6d'.

Reference numeral 441 denotes a known detachably engaging unit which detachably engages the bolster plate 440 to the cover plate 430; 435 denotes a stopper fixed onto the bolster plate 440; 442 denote a plurality of rods the respective ends of which are fixed onto the bolster plate 440; 443 denotes a mold opening/closing cylinder fastened to the other ends of the rods 442 by bolts; 444 denotes an extension rod fixed onto the top of a rod 443a of the mold opening/closing cylinder 443; 446 denotes a sleeve assembled in the extension rod 444 so as to be rotatable (slidable) and 445 denotes a bush screwed to the inside of the upper end of the sleeve 446.

The coupling means for coupling the above mold opening/closing cylinder 443 to the above upper disc 414 is comprised of the extension rod 444, the bush 445, the sleeve 446, a coupling rod 439 which is integrally engaged to the inner ring 438, and plural pairs of claws 439a and 446a which are formed in the outer peripheral upper portion of the coupling rod 439 and the inner peripheral lower portion of the sleeve 446 so as to be engageable or passible in the axial direction thereof in accordance with a rotating angle of the sleeve 446.

Reference numeral 448 denotes a lever a top of which is fork-shaped. The lever 448 is rotatably engaged to the bolster plate 440 through a pin 449. A cylinder 450 is fitted between the other end of the lever 448 and the bolster plate 440 so that the lever 448 swings about the center of the pin 449 by the actuation of the cylinder 450.

Reference numeral 447 denotes a rod fixed onto the arm 446c extending outwardly from the sleeve 446. The rod 447 is in parallel to the sleeve 446. The rod 447 is inserted into a U-shaped groove which is formed in the top fork portion of the above lever 448, and the top of the arm 437 is inserted into a key groove 446a which is formed in the outer periphery of the sleeve 446 in parallel to the axis The above arm 437 is fixed onto the outer ring 434, and the operation of the cylinder 450 allows the lever 448 to swing so that the sleeve 446 rotates. The outer ring 434 is also rotated through the sleeve 446 and the arm 437. The rotation, when the paired claws 434a and 438a are in an engagement state, enables the paired claws 439a and 446b to pass (a release state), and when the paired claws 434a and 438a are in a passable state (a release state), makes the paired claws 439a and 446b in the engagement state.

A description will be given of the operation of the tire vulcanizer split mold unit shown in FIGS. 25 to 27, which is applied to the tire vulcanizer shown in FIGS. 23 and 24.

FIGS. 23 to 25 and 27 show a state in which the vulcanization of the tire within the tire vulcanizing mold Ma which has been mounted on the mold table 5a' of the vulcanizing station 1a' has been finished, and the mold Ma has been then taken in the mold opening/closing unit 6a' of the mold opening/closing station 2a' by means of a mold carrier truck 3a'.

In this situation, the paired claws 434a and 438a are in the engagement state, and the paired claws 439a and 446b are in the passible state.

From this state, the cylinder 6d is first actuated to move the arm 6c' down, and the detachably engaging unit 441 allows the cover plate 430 and the bolster plate 440 to be coupled to each other (refer to FIG. 26). Also, the heated and pressurized medium passages 420c and 420d are connected to a piping (not shown) external to the mold through the quick couplers 428 and 429.

Subsequently, a changeover valve (not shown) is actuated in such a manner that the heated and pressurized medium is exhausted from the interior of the tire T, and after it has been confirmed that a pressure within the tire T was sufficiently lowered, the cylinder 450 is actuated so that the paired claws 439a and 446b are engaged with each other and the upper disc 414 and the rod 443a of the cylinder 443 are coupled to each other. Also, the paired claws 434a and the 438a are made in the passible state, to thereby release the lock.

Thereafter, as has been well known, the cylinder 443 is actuated in a direction toward which the upper disc 414 is pushed down, and the cylinder 6d' is actuated in a direction toward which the bolster plate 440 goes up. With such operation, the tread mold 409 is peeled off from the tire T, and the diameter of the tread mold 409 is expanded. Also, the engagement of the claw 410b with the claw 414b and the engagement of the claw 403a with the claw 410c are released, respectively and the bolster plate 440 further goes up. When the cylinder 443 reaches the stroke end, the upper disc 414 is lifted up, because the claw 439a is engaged with the claw 446b, the upper disc 414 is lifted up to thereby open the tire vulcanizing mold.

Subsequently, the vulcanized tire T is taken out to the outside of the tire vulcanizing mold, a tire to be succeedingly vulcanized is taken in the tire vulcanizing mold, and the cylinder 6d' is then actuated in a backward direction before the tire vulcanizing mold is closed. With such operation, the segment 410 hung from the upper disc 414 first abuts against the pressure plate 404, and thereafter while the cylinder 443 is moved back, the outer cylinder 410 goes down through the bolster plate 440 so that the tread m old 409 is reduced in diameter. Thus, the tire vulcanizing mold is closed.

During that operation, a pressure gas for shaping is introduced in the interior of the tire T, and the claws 410b and 403a are then engaged with the claws 414b and 410c, correspondingly, at a final stage where the diameter of the tread mold 409 is reduced.

After the tire vulcanizing mold has been closed in this manner, the actuation of the cylinder 443 is stopped, and the cylinder 450 is actuated in the backward direction so that the paired claws 434a and 438a are engaged with each other, and the cover plate 430 and the upper disc 414 are locked together. Simultaneously, the paired claws 439a and 446b are made in the passible state, and the heated and pressurized medium is introduced in the interior of the tire before advancing to a vulcanizing process.

In this situation, a force which is exerted so as to make the side wall molds 405 and 413 move away from each other due to a pressure of the heated and pressurized medium is offset within the mold unit through the upper disc 414, the claws 414b, 410b, the segment 410, the claws 410c, 403a, and the lower disc 403. A force which is exerted in the radial direction so as to enlarge the diameter of the tread mold 409 is offset within the outer ring 111 through the segment 410. Simultaneously, a vertical component of the radial directional force which is caused by a slide inclined surface interposed between the segment 410 and the outer ring 411, that is, a force which is exerted so as to make the outer ring 411 float is offset within the mold unit through the spacer ring 412, the hard heat-insulating material 431, the cover plate 430, the outer ring 434, the claws 434a, 438a, the inner ring 438, the upper disc 414, and the claws 414b and 410b.

Hence, it is needless to hold the mold unit by an external force through the bolster plate 440. The detachably engaging unit 441 is released, and the cylinder 6d' is actuated so that the arm 6c' goes up before the mold unit is moved at a predetermined position of the vulcanizing station in the procedure reverse to the above-mentioned procedure. Then, the vulcanization is continued.

Subsequently, the tire vulcanizer of the foregoing item (3) will be described with reference to FIGS. 28 to 34.

FIG. 28 is a plan view showing one example of a tire vulcanizer.

FIG. 29 is a front view showing the tire vulcanizer taken along a line 29—29 in FIG. 28.

FIG. 30 is a vertical cross-sectional side view showing the tire vulcanizer taken along a line 30—30 in FIG. 29.

FIG. 31 is a vertical cross-sectional side view showing the tire vulcanizer taken along a line 31—31 in FIG. 30.

FIG. 32 is a horizontal cross-sectional plan view showing one example of the mold detachably engaging unit taken along a line 32—32 in FIG. 31.

FIG. 33 is a horizontal cross-sectional plan view showing another example of the mold detachably engaging unit taken along a line 32—32 in FIG. 31.

FIG. 34 is a front view showing an unvulcanized tire supply unit of FIG. 28.

First, the whole tire vulcanizer will be described with reference to FIGS. 28 and 29. Reference numeral 1 denotes a base which is equipped with a bladder manipulating lower center mechanism etc, M ($M_1$, $M_2$ . . . ) denotes plural pairs of tire molds engaged onto the upper surface of the base 1 by bolts or the like; and 2 denotes a railway disposed in parallel to each of the tire molds M, which is fixed onto the upper surface of the base 1.

Reference numeral 3 denotes a mold opening/closing unit which travels on the railway 2; 20 denotes a travel frame of the mold opening/closing unit 3; 24 denotes a mold elevation cylinder fixed onto the travel frame 20. The lower portion of a piston rod of the mold elevation cylinder 24 is fixed onto an arm 21 which is engaged onto the travel frame 20 so as to go up and down. The arm 21 is equipped with an upper center mechanism 23 and engaged with a mold detachably engaging unit 22.

Reference numeral 4 denotes an unloader which travels on the railway 2; 4a, an arm; and 4b, a tire gripping mechanism assembled in the top portion of the arm 4a. The arm 4a is engaged onto the travel frame of the unloader 4 so as to go up and down and also be swingable. The unloader 4 is identical with a known unloader except that it travels on the railway 2.

Reference numeral 5 denotes a loader which travels on the railway 2; 5a denotes an arm; and 5b a tire gripping mechanism assembled in the top portion of the arm 5a. The arm 5a is engaged onto the travel frame of the loader 5 so as to go up and down and also be swingable. The loader 5 is identical with a known loader except that it travels on the railway 2.

Reference numeral 6 denotes an unvulcanized tire supply unit which will be described in detail later; 7 denotes a base for a vulcanized tire grip inflation cooler (PIC) which is equipped with a tire inflation air changeover valve, etc.; and P ($P_1$, $P_2$, . . . ), denotes a plurality of vulcanized tire grip inflation coolers which are detachably engaged onto the vulcanized tire grip inflation cooler base 7. The vulcanized tire grip inflation coolers are similar to a known vulcanized tire grip inflation coolers ($P_1$, $P_2$, . . . ) except that it is detachably engaged onto the base 7.

Reference numeral 8 denotes a railway fitted onto the base 7; 9 denotes unloader for the vulcanized tire grip inflation cooler, which travels on the railway 8; and 10 denotes a travel frame of the unloader 9. A lock housing elevator 10a is engaged onto one side surface of the travel frame 10 so as to go up and down. The top portion of the lock housing elevator 10a is engaged onto a lock housing detachably engaging unit 10b. An arm 10c is engaged onto the other side surface of the above travel frame 10 so as to go up and down and also be swingable, and a tire grip mechanism 10d is engaged onto the top portion of the arm 10c.

Reference numeral 11 denotes a vulcanized tire send-out belt conveyor; and 12 is a storage unit for rings to be used in the vulcanized tire grip inflation cooler P ($P_1$, $P_2$ . . . ).

Subsequently, the above-mentioned respective tire molds M and the detachably engaging unit 22 will be described in detail with reference to FIGS. 30 to 33.

Reference numeral 501 denotes a lower disc which is fixed onto the above base 1 through a heat insulating plate 500, the upper surface of which a lower heating plate 503 having a flange 503a in the outer peripheral portion thereof and a guide plate 502 are fixed. A lower side wall mold Md is fastened on the upper surface of the lower heating plate 503 by bolts. An outer cylinder 29 of the lower center mechanism 28, which manipulates the bladder B and also supplies or exhausts a heated and pressurized medium and so on to or from the bladder B, hangs from the inner peripheral portion of the lower heating plate 503. It should be noted that Me is a lower bead ring which is engaged onto the lower center mechanism through a known means.

Reference mark Mc denotes a tread mold which is divided into a plurality of pieces in the peripheral direction thereof; and reference numeral 504 are segments which are fastened onto the outer surface of each of the tread molds Mc. The number of segments 504 are the same as that of the tread molds Mc. Each of the segments 504 is guided by a guide 510b which extends radially from a flange 510a integrally formed in the outer peripheral portion of the upper heating plate 510, and is slidably supported in the radial direction so as to hang therefrom. Then, the upper side wall mold Mb is fastened onto the lower surface of the upper heating plate 510 by bolts, the upper bead ring Ma is fastened in the inside of the upper side wall mold Mb by bolts, and a pressure plate 511 is fastened on the inside of the upper bead ring Ma by bolts.

Reference numeral 509 denotes an upper disc, on an outer peripheral lower surface of which an outer ring 505 having a steam chamber therein is fastened by bolts through a spacer 508. A T-material 506 is fixed onto the outer inclined surface of the segments 504. The T-material 506 is slidably engaged with a T-groove which is defined in the inner inclined surface of the outer ring 505 and extends vertically. The upper disc 509 goes up and down with respect to the upper heating plate 510, whereby the tread mold Mc slides in the radial direction together with the segment 504. When the lower surface of the segments 504 and the guide plate 502 which is in surface contact with the segments 504 slide until the segments 504 move inwardly in the radial direction, the respective molds Mb, Mc and Md are joined together so that the inner surfaces of the respective molds Mb, Mc and Md form the outer surface of the tire, and also claws 504a and 504b integrally formed in the respective upper and lower ends of the segments 504 are engaged with the flanges 503a and 510a of the lower heating plate 503 and upper heating plate 510. Reference numeral 507 denotes a heat insulating material.

It should be noted that the above-mentioned respective tire molds M correspond to a tire mold of the type in which a force which is exerted so as to make the tire mold open due to a pressure of the heated and pressurized medium (steam, (steam+inert gas), or warm water) of a high temperature and a high pressure, which has been introduced into the interior of the tire when the tire is vulcanized, is offset within the tire mold.

On the other hand, in the upper center mechanism 23 equipped in the arm 21 of the above mold opening/closing unit 3, the head end of the segment opening/closing cylinder 25 is fixed onto the arm 21 through the flange, and a piston rod 25a of the above segment opening/closing cylinder 25 and a flange 512 which is fastened onto the inside of the upper heating plate 110 of the mold M by bolts are detachably engaged to each other through a coupling ring 27.

That is, a ring 26 is fixed onto the top portion of a piston rod 25a which is inserted into the upper hole of the coupling ring 27, and a plurality of claws 27a are integrally formed in the inner surface of the lower end portion of the coupling ring 27. A plurality of convex claws 512b of the same number as that of the claws 27a, which are engaged with the claws 27a or pass between the respective claws 27a in accordance with the swinging turning angle of the coupling ring 27, are integrally formed in the upper end portion of a shaft 512a which extends from the center portion of the flange 512 upwardly. A lever 27b is fixed onto the coupling ring 27, and the other end portion of the lever 27b is coupled to a coupling cylinder (not shown).

Also, in the above mold detachably engaging unit 22, a rotary cylinder 30 is fastened on an arm 21 by bolts, and a T-rod 31 of the rotary cylinder 30 is rotatably inserted into the arm 21. A claw 509a is disposed in the inner surface of the inner hole of the upper disc 509, and a claw 31a which is engaged with the claw 509a or passes through the claw 509a is disposed in the lower end portion of the T-rod 31.

Subsequently, a description will be given in more detail of the above-mentioned unvulcanized tire supply unit 6 with reference to FIG. 34.

Reference numeral 30 denotes frames fitted onto the floor surface; 31 denotes rails fixed onto the frames 30; and 32 denotes a roller conveyor which goes up and down along the rail 31. The roller conveyor 32 goes up and down by means of a driver unit (not shown). Reference numeral 33 (33a, 33b, 33e) denotes a plurality of roller conveyors (unvulcanized tire storage rack) engaged to the frames 31; 34 denotes rails fixed onto the frames 31; and 35 denotes a roller conveyor which goes up and down along the rail 34. The roller conveyor 35 goes up and down by means of a driver unit (not shown).

The operation of the above-mentioned tire vulcanizer will be described.

FIG. 28 shows a state of the tire within the tire mold $M_1$ immediately after the vulcanization of that tire is finished, and a state in which the mold opening/closing unit 3, the unloader 4 and the loader 5 are gathered at a position of the tire mold $M_1$, and the loader 5 has already gripped a succeeding unvulcanized tire.

Upon the completion of vulcanization, when the heated and pressurized medium within the tire starts to be exhausted, the arm 21 of the mold opening/closing unit 3 is made go down. After the arm 21 is abutted against the tire mold $M_1$, the rotary cylinder 30 of the mold detachably engaging unit 22 and the coupling cylinder of the upper center mechanism 23 are actuated to couple the arm 21 to the tire mold $M_1$.

After the heated and pressurized medium within the tire is exhausted so that the inner pressure of the bladder is sufficiently lowered, while the piston rod 25a of the segment opening/closing cylinder 25 in the upper center mechanism 23 is actuated in the extension direction, the mold elevation cylinder 24 is actuated so that the arm goes up. The upper disc 509 of the tire mold $M_1$ and the upper heating plate 510 are away from each other so that the tread mold Mc is expanded in diameter together with the segments 504 so as to be peeled off from the tire T. Also, the respective engagements of the segments 504, the upper heating plate 510 and the lower heating plate 503 are released. After the segment opening/closing cylinder 25 reaches the stroke end, the upper side wall mold 3b is peeled off from the tire T and goes up.

Subsequently, with the operation of the lower center mechanism 28, the lower bead ring Mc is pushed up so that the tire T is peeled off from the lower side wall mold Md. The bladder B is drawn in the lower center mechanism 28 and accommodated therein. Then, after the gripping mechanism 4b of the unloader 4 is allowed to swing and go down, it grips the vulcanized tire T, and hangs out the tire T while going up and swinging.

After the vulcanized tire T has been hung out, the loader 5 is allowed to swing and go down so that an unvulcanized tire to be succeedingly vulcanized which is gripped by the loader 5 is located within the tire mold. After the unvulcanized tire has been located within the tire mold, the unvulcanized tire is released from the gripping mechanism 5b, and the loader 5 goes up and swings, and if necessary, travels to go for a next unvulcanized tire to the unvulcanized tire supply unit 6.

On the other hand, the vulcanized tire T hung by the above unloader 4 is supplied to the vulcanized tire grip inflation cooler 7 while the unloader 4 is made to travel as occasion demands. In FIG. 28, the vulcanized tire T is supplied to $P_1$ or $P_2$.

Also, in the unvulcanized tire supply unit 6, f or example, if a tire at a position $B_2$ in FIG. 34 is selected as a tire to be supplied, the roller conveyor 32 is lifted up until it reaches a position $B_1$ (solid-line position). Then, the roller conveyor 32 and the roller conveyor 33b are driven simultaneously in such a manner that the tire at the position $B_2$ is moved to the position $B_1$ together with a pan 36, and the tire at a position $B_3$ is moved to the position $B_2$. Thereafter, the roller conveyor 32 is lifted up and moved to the position $A_1$ (send-out position) so as to be on standby until the loader 5 comes for the tire.

Subsequently, the loader 5 allows the unvulcanized tire to hang up, and the roller conveyor 32 on which the empty pan 36 is mounted is allowed to go down to a position $E_1$. Also, the empty roller conveyor 35 is allowed to go down to a position $E_4$. Then, the roller conveyors 32, 33e and 35 are driven simultaneously so that the pan 36 on the roller conveyor 32 is transported onto the roller conveyor 35 through the roller conveyor 33e.

Upon the arrival of the pan 36, the roller conveyor 35 is lifted up to an unvulcanized tire receiving position $A_4$, and after the unvulcanized tire is supplied to the pan 36, it is transported to an empty storage position (in this case, a position $B_3$ in FIG. 7) together with the pan 36.

Even though a tire to is succeedingly used be located at a position $B_3$ the tire at the position $B_2$ is transported to a position $B_3$ through the belt conveyors 32, 33e and 35, during which the tire which has been at the position $B_3$ is moved to the position $B_2$. Accordingly, after this operation, it is transported to the position $A_1$ (send-out position) in the foregoing procedure.

The above-mentioned tire vulcanizer has a precondition of using a split mold unit (popularly named "sectional mold container" or "segment mold container") or using a split mold unit of the self-lock type which has already been proposed by this applicant.

The above-mentioned tire vulcanizer per se is remarkably effective in space-saving, the reduction of manufacturing costs and the automating of a factory, etc. Although the conventional tire vulcanizer (a tire vulcanizing mold assembled in the sectional mold container for use) can be used as it is, a split mold unit must be newly prepared. Accordingly, it is disadvantageous from the standpoint of a more economical vulcanizer.

SUMMARY OF THE INVENTION

The present invention has been proposed in view of the above-mentioned problems, and therefore an object of the invention is to provide a tire vulcanizing mold assembly which can be used without adding a split mold unit to the conventional tire vulcanizer which has already been proposed by this applicant.

In order to achieve the above object, according to the present invention, there is provided a tire vulcanizing mold assembly including an upper flange disposed in an outer peripheral portion of an upper mold of a tire vulcanizing mold or an upper flange disposed in the outer peripheral portion of a plate into which the upper mold is assembled; a lower flange disposed in an outer peripheral portion of a plate into which a lower mold is assembled so as to go up and down; a lock ring which is rotatably assembled into one of said respective flanges and detachably engaged to the other flange, characterized in that one end portion of a pressurizing unit is detachably engaged to the plate; an output rod is engaged onto the other end portion of said pressurizing unit so as to abut against the lower mold through the plate portion; and when the tire vulcanizing mold is closed so that the respective flange portions are coupled to each other by said lock ring, mold opening force due to the inner pressure of said tire vulcanizing mold is prevented.

In the tire vulcanizing mold assembly according to a first aspect of the present invention, there may be further provided a projection piece disposed in the lock ring and a lock ring rotation drive mechanism which is detachably engaged to said projection piece.

In the tire vulcanizing mold assembly according to a second aspect of the present invention, there may be further provided a frame for locating the tire vulcanizing mold assembly and an elastic assembly for supporting said pressurizing unit onto said frame.

Also, according to the present invention, there is provided a tire vulcanizing mold assembly including an upper flange disposed in an outer peripheral portion of an upper mold of a tire vulcanizing mold or an upper flange disposed in the outer peripheral portion of a plate into which the upper mold is assembled; a lower flange disposed in an outer peripheral portion of a plate into which a lower mold is assembled so as to go up and down; a lock ring which is rotatably assembled into one of said respective flanges and detachably engaged to the other flange, characterized in that there are provided a pressurizing unit for pressurizing said plate and said lower mold in a separating direction, and a driver unit for said pressurizing unit.

Further, according to the present invention, there is provided a tire vulcanizing mold assembly including an upper flange disposed in an outer peripheral portion of an upper mold of a tire vulcanizing mold or an upper flange disposed in the outer peripheral portion of a plate into which the upper mold is assembled; a lower flange disposed in an outer peripheral portion of a plate into which a lower mold is assembled so as to go up and down; a lock ring which is rotatably assembled into one of the respective flanges and detachably engaged to the other flange, characterized in that there is provided a spring assembly which urges the plate and said lower mold in a separating direction.

In the tire vulcanizing mold assembly according to a fourth aspect of the present invention, one end portion of the pressurizing unit may be engaged to the plate, and an output rod may be engaged to the other end portion of the pressurizing unit so as to abut against the lower mold through the plate portion so that when the respective flanges are coupled by the lock ring, the tire vulcanizing mold is pressed and closed by the pressurizing unit.

In the tire vulcanizing mold assembly according to the first through the third aspects of the present invention, the following operation is conducted. (1) The tire vulcanizing mold assembly is conveyed from a mold exchange place to the tire vulcanizer. (2) In this situation, an output shaft of the pressurizing unit at a place where the mold is located is completely drawn in. Also, the engagement portion is in a floating state which is convenient to the entrance of the mold assembly. (3) The tire vulcanizing mold assembly is stopped at a predetermined position and fixed there. In this situation, the lock ring rotation driver is also engaged. (4) The mold closing unit is moved to a position of the tire vulcanizing mold assembly and coupled to the latter, and the rotation drive mechanism of the lock ring is operated so as to prepare to open the mold. (5) Subsequently, the mold is opened, and a crude tire is supplied thereto before the mold is closed. (6) The lock ring is moved to a coupling state, and the output shaft of the pressurizing unit is extended so that the mold is pressed. The engagement portion of the pressurizing unit is also moved to engagement state so that the mold is pressed and closed. (7) When the pressing operation due to the pressurizing unit starts, the mold closing unit releases the coupling, moves to another mold position, and performs a predetermined work. Thereafter, the mold closing unit returns to the mold position at an appropriate timing. (8) After the vulcanization has finished, the output shaft of the pressurizing unit is slightly drawn back because of the pressurized state so that the pressing and closing forces on the mold are released, and the lock ring returns to a rotatable state. (9) The lock ring rotates and is coupled to the mold closing unit which is made in a coupling release state, and the mold is opened. The take-out of a finished tire and the supply of a crude tire are sequentially conducted. (10) After the crude tire has been supplied thereto, the mold is closed, and the lock ring is again in the coupling state. The output shaft of the pressurizing unit is extended so that the mold is pressed. The engagement portion of the pressurizing unit is moved to the engagement state so that the mold is pressed and closed. Thereafter, the same operation is repeated, and when the mold or bladder is exchanged, the output shaft of the pressurizing unit is completely taken in, and removed before being conveyed.

In the tire vulcanizing mold assembly according to the fourth through a sixth embodiments of the present invention, the following operation is conducted.

A tire vulcanizing mold the vulcanization of which has been finished is received by the mold carrier truck from the vulcanizing station in which a plurality of tire vulcanizing mold which are now being vulcanized are arranged, and transported to the mold opening/closing station. After the tire vulcanizing mold which is transported to the mold opening/closing station is coupled to the mold opening/closing unit, the mold is opened with the operation of the mold opening/closing unit, and the vulcanized tire is taken out by the unloader which is engaged to the mold opening/closing unit. An unvulcanized tire to be succeedingly vulcanized is taken in the tire vulcanizing mold from which the vulcanized tire has been taken out by the loader engaged thereto. The shaping of the tire is conducted during a tire vulcanizing mold closing process, and after the tire vulcanizing mold has been closed, the heated and pressurized medium is introduced into the interior of the tire and charged therein, then advancing to a tire vulcanizing process. Then, the coupling of the mold in which the vulcanization starts to the mold opening/closing unit is released, and the mold is again transported by the mold carrier truck so as to return to the vulcanizing station. In the process of the above operation, according to the fourth and the sixth embodiments of the present invention, (1) after the mold has been closed by the mold opening/closing unit position, the lock ring is operated and a mold fastening force is provided by the pressurizing unit, and the heated and pressurized medium which reaches a predetermined vulcanization pressure at that position is charged if necessary. (2) Even though it is moving or reaches the vulcanizing station, the above pressurizing unit is operated. (3) The release of the mold fastening force is conducted in the vulcanizing station, during the transportation by the carrier truck, or in the mold opening/closing unit portion. In the fifth aspect of the present invention, (1) when the mold is closed at the mold opening/closing unit position, a spring body disposed in the lower mold portion is closed while being crushed. Thereafter, the lock ring is moved into a coupling state, and then the coupling of the mold to the mold opening/closing unit is released in such a manner that the opening/closing unit lifts up. Then, the spring body is operates so that a clearance existing above or below the lock ring disappears, and the mold is held in the closed state against a lower pressure or intermediate pressure within the tire. (2) When the mold is conveyed by the carrier truck and arrives at the vulcanizing station, the pressurizing unit at the vulcanizing station side is operated in such a manner that the conveyed mold is pressurized up to a predetermined mold fastening force. Thereafter, a predetermined high-pressurized heated medium is supplied. (3) The release of the mold fastening force is conducted in the respective vulcanizing station.

BRIEF DESCRIPTION OF THE DRAWINGS

Other objects, advantages and features of the invention will be apparent when carefully reading the following detailed description in connection with the accompanying drawings, in which.

DETAILED DESCRIPTION OF THE PREFERRED EMBODIMENTS

Now, a description will be given of a tire vulcanizing mold assembly in accordance with the present invention with reference to FIGS. 1 to 5 which show one embodiment (first embodiment).

Figure 1:
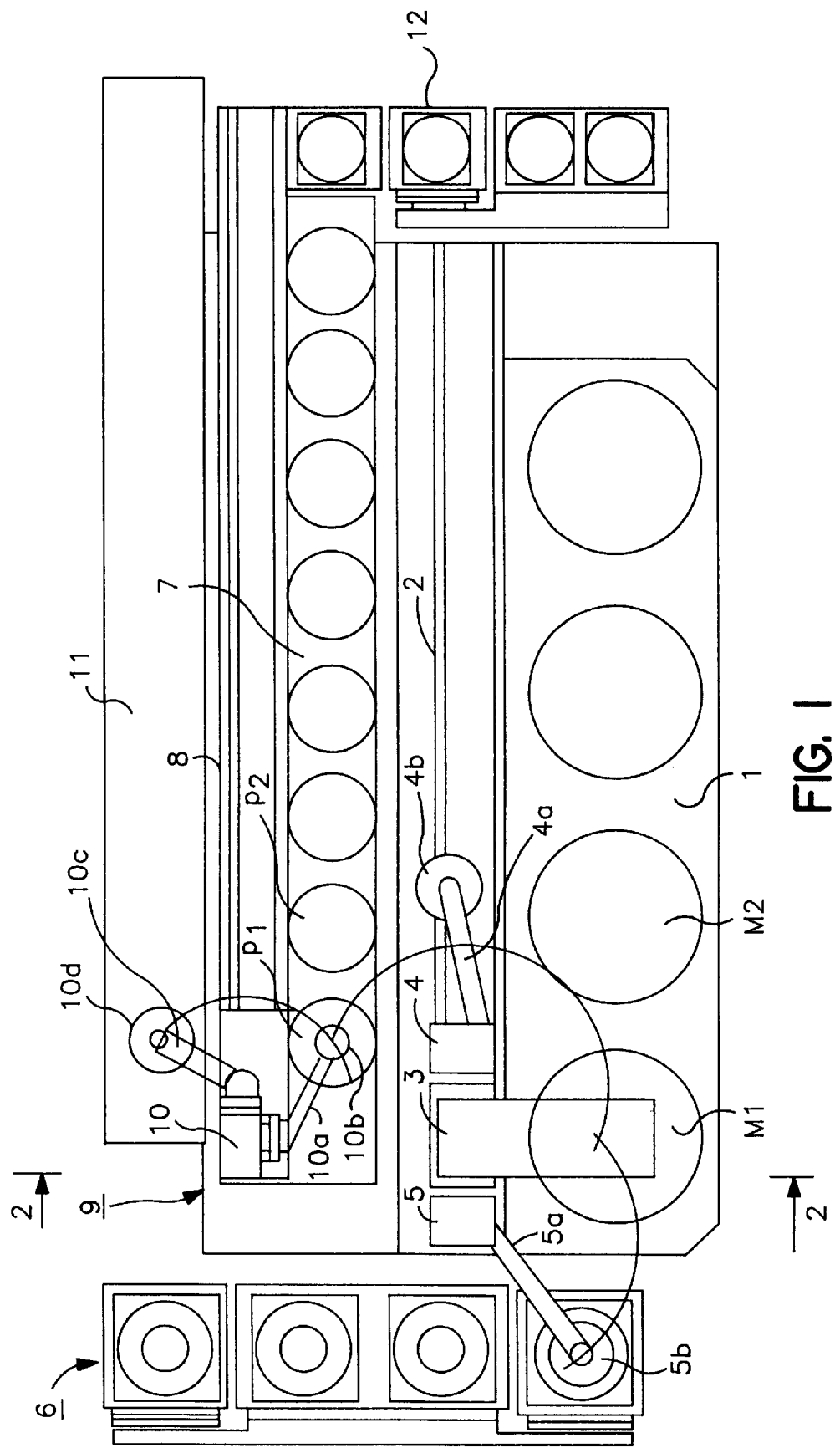
FIG. 1 is a plan view showing one example of a tire vulcanizer.

FIG. 1 is a plan view showing one example of a tire vulcanizer.

Figure 2:
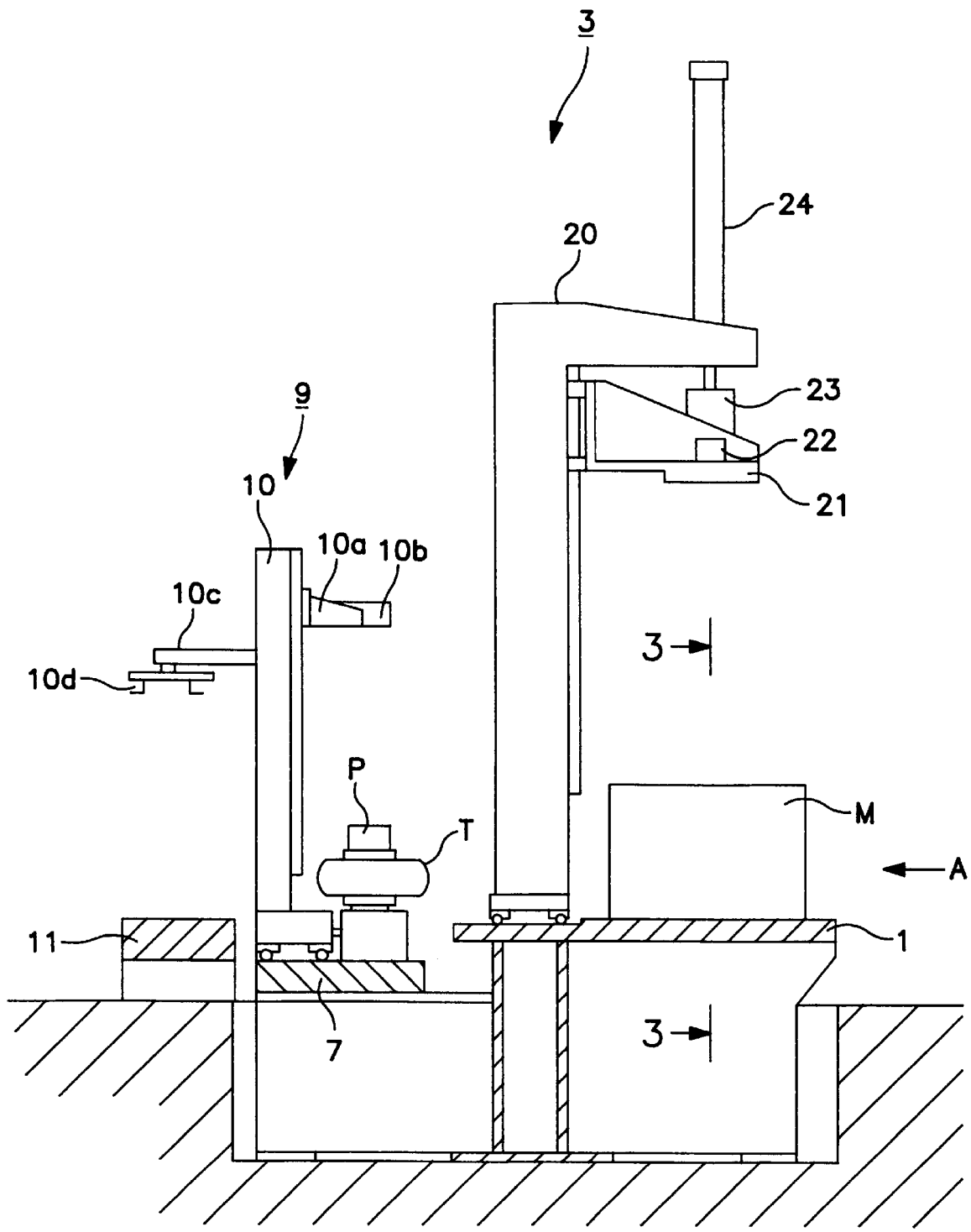
FIG. 2 is a side view showing the tire vulcanizer taken along a line 2—2 in FIG. 1.

FIG. 2 is a side view showing the tire vulcanizer taken along a line 2—2 in FIG. 1.

Figure 3:
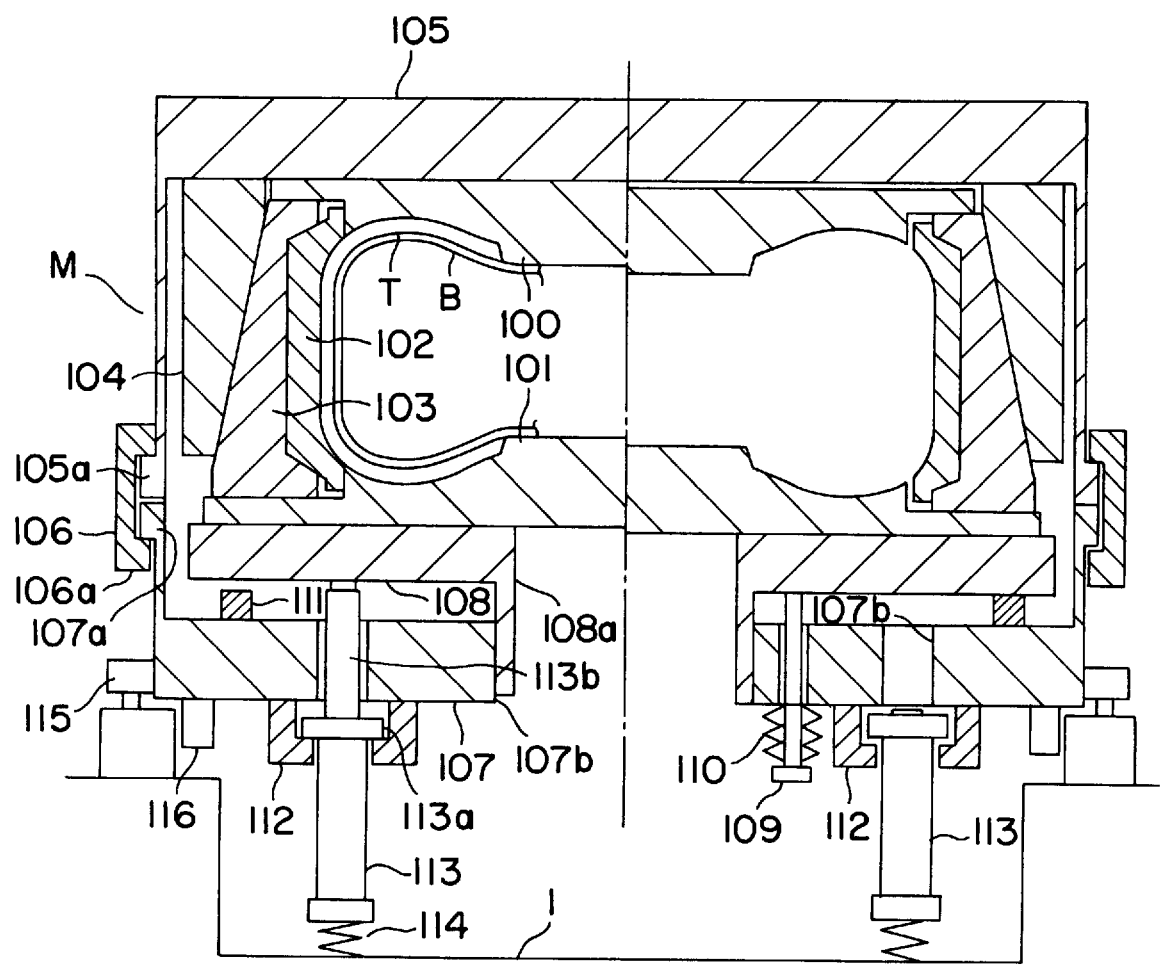
FIG. 3 is a side view showing one example (first embodiment) of a tire vulcanizing mold assembly in accordance with the present invention, which is viewed from an arrow A in FIG. 2.

FIG. 3 is a vertical cross section side view showing the first embodiment of a tire vulcanizing mold assembly (popularly named "sectional mold container built-in type tire vulcanizing mold assembly") in accordance with the present invention, which is viewed from an arrow A in FIG. 2. The left half of FIG. 3 shows a state in which the tire T is vulcanized through the bladder B while being pressurized by the pressurizing unit, whereas the right half thereof shows a state in which the mold assembly moves for the exchange of the molds or bladders and so on.

Figure 4:
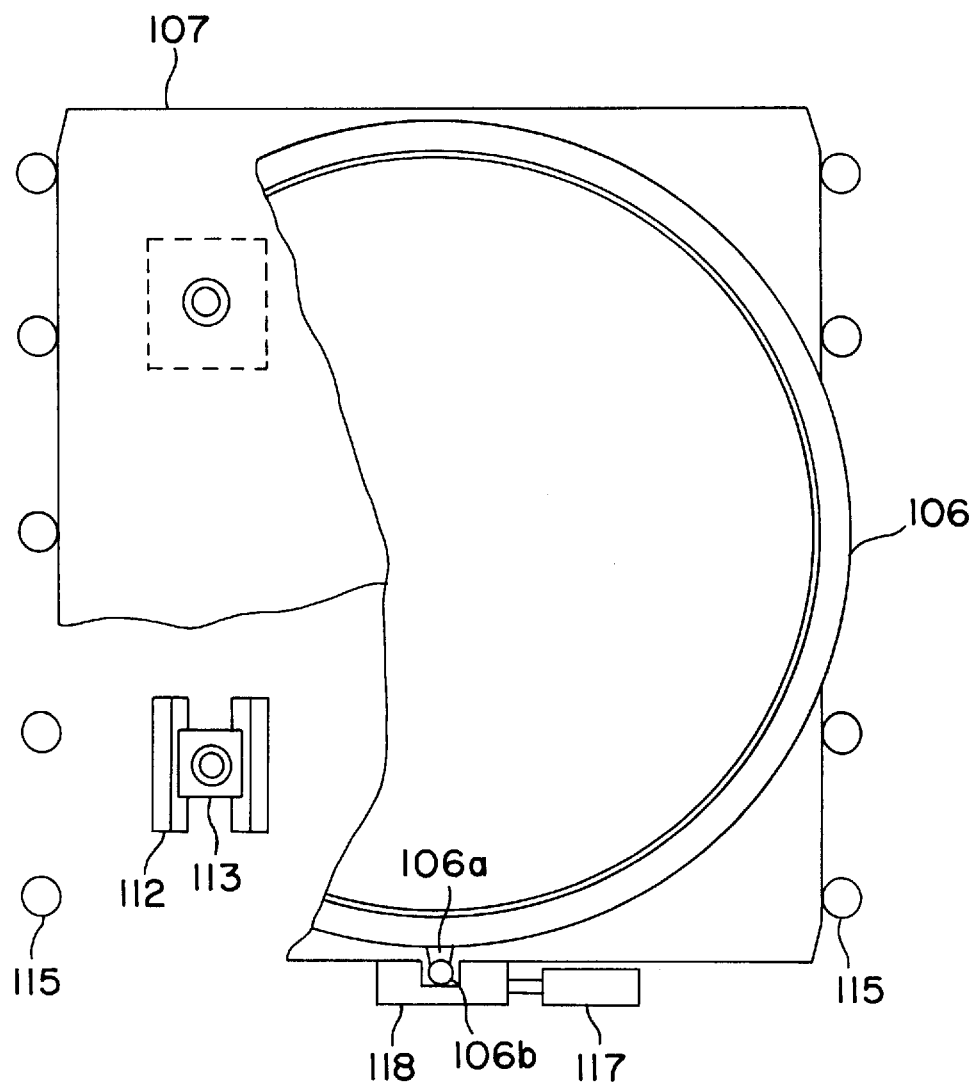
FIG. 4 is a plan view showing an first embodiment of the tire vulcanizing mold assembly in accordance with the present invention.

FIG. 4 is a plan view showing the tire vulcanizing mold assembly of FIG. 3 a part of which is cut off.

Figure 5:
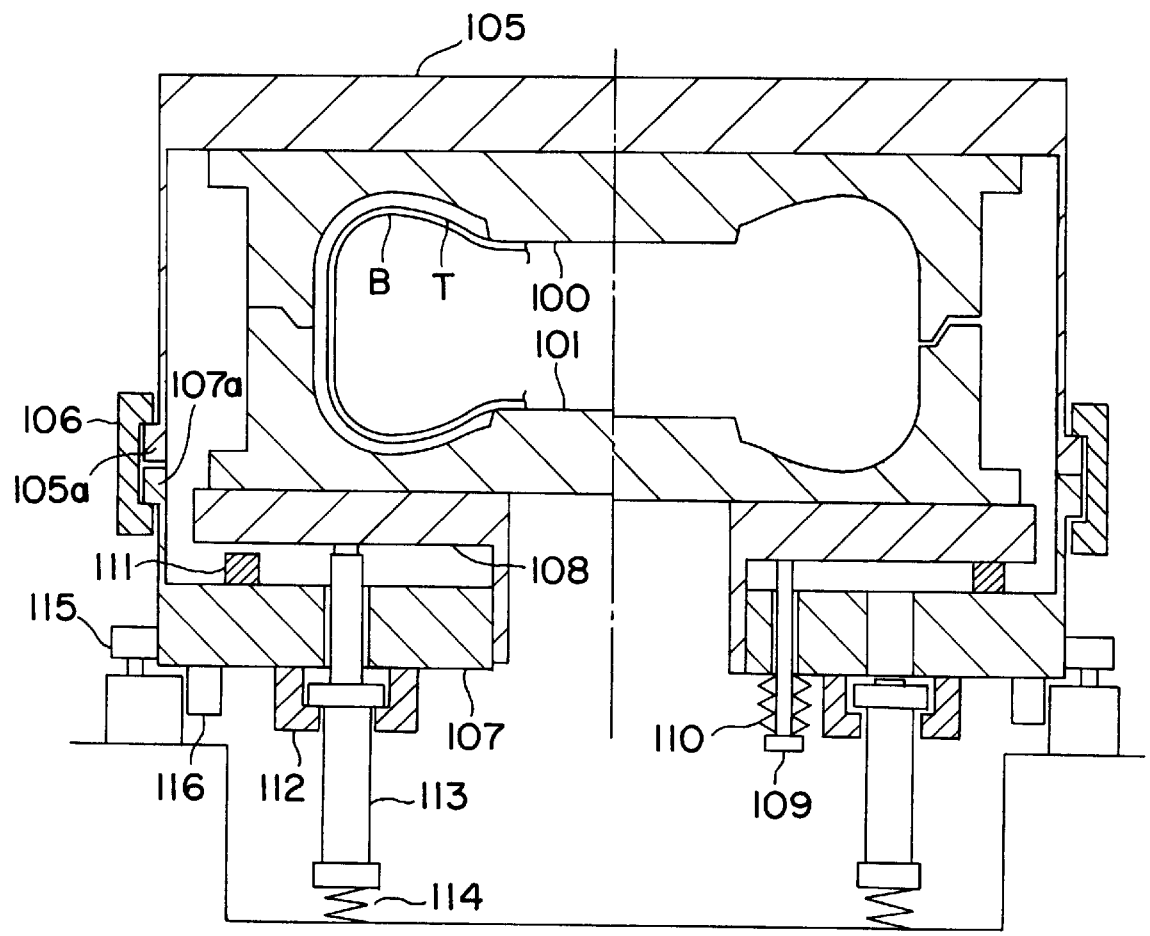
FIG. 5 is a vertical cross-sectional side view showing the tire vulcanizing mold assembly, which is viewed from an arrow A in FIG. 2.

FIG. 5 is a vertical cross-sectional side view showing the tire vulcanizing mold assembly (popularly named "two-piece mold or two-division mold built-in type tire vulcanizing mold assembly") in accordance with the present invention, which is viewed from an arrow A in FIG. 2. The left half of FIG. 5 shows a state in which the tire T is vulcanized through the bladder B while being pressurized by the pressurizing unit, whereas the right half thereof shows a state in which the mold assembly moves for the exchange of the molds or bladders and so on.

It should be noted that since the bladder manipulation center mechanism has been described in more detail with reference to the tire vulcanization split mold unit in the above-mentioned item (2) which has already been proposed by this applicant, it is omitted from being shown. Also, since the split mold opening/closing unit mechanism has been described in more detail with reference to the tire vulcanization split mold unit in the above-mentioned item (2), it is omitted from being shown.

First, the whole tire vulcanizer will be described with reference to FIGS. 1 and 2. Reference numeral 1 denotes a base which is equipped with a pressurizing unit and a bladder manipulating center mechanism, etc.; M ($M_1$, $M_2$ . . .) denotes plural pairs of tire vulcanizing molds which are disposed on the upper surface of the base 1; and denotes 2 denotes a railway disposed in parallel to each of the tire molds M, which is fixed onto the upper surface of the base 1.

Reference numeral 3 denotes a mold opening/closing unit which travels on the railway 2; 20 denotes a travel frame of the mold opening/closing unit 3; 24 denotes a mold elevation cylinder fixed onto the travel frame 20. The lower end portion of a piston rod of the mold elevation cylinder 24 is fixed onto an arm 21 which is engaged onto the travel frame 20 so as to go up and down. The arm 21 is equipped with an upper center mechanism 23 and engaged with a detachable mold engaging unit 22.

Reference numeral 4 denotes an unloader which travels on the railway 2; 4a denotes an arm; and 4b denotes a tire gripping mechanism assembled in the top portion of the arm 4a. The arm 4a is engaged onto the travel frame of the unloader 4 so as to go up and down and also be swingable. The unloader 4 is identical with a known unloader except that it travels on the railway 2.

Reference numeral 5 denotes a loader which travels on the railway 2; 5a, an arm; and 5b, a tire gripping mechanism assembled in the top portion of the arm 5a. The arm 5a is engaged onto the travel frame of the loader 5 so as to go up and down and also be swingable. The loader 5 is identical with a known loader except that it travels on the railway 2.

It should be noted that in this embodiment, the railway 2 is commonly used for the mold opening/closing unit 3, the unloader 4 and the loader 5, but it may also be exclusive.

Reference numeral 6 denotes an unvulcanized tire supply unit which has been described in detail with reference to the tire vulcanizer in the above-mentioned item (3) which has already been proposed by this applicant; 7 denotes a base for a vulcanized tire grip inflation cooler (PIC) which is equipped with a tire inflation air changeover valve, etc.; and P ($P_1$, $P_2$, . . . ) denotes a plurality of vulcanized tire grip inflation coolers which are detachably engaged onto the vulcanized tire grip inflation cooler base 7. The vulcanized tire grip inflation coolers P($P_1$, $P_2$. . . ) are similar to a known vulcanized tire grip inflation cooler except that they are detachably engaged onto the base 7.

Reference numeral 8 denotes a railway fitted onto the base 7; 9, an unloader for the vulcanized tire grip inflation cooler, which travels on the railway 8; and 10 denotes a travel frame of the unloader 9. A lock housing elevator 10a is engaged onto one side surface of the travel frame 10 so as to go up and down. The top portion of the lock housing elevator 10a is engaged onto a detachable lock housing detachably engaging unit 10b. An arm 10c is engaged onto the other side surface of the above travel frame 10 so as to go up and down and also be swingable, and a tire grip mechanism 10d is engaged onto the top portion of the arm 10c. Reference numeral 11 denotes a vulcanized tire send-out belt conveyor; and 12 is a storage unit for rings to be used in the vulcanized tire grip inflation cooler P ($P_1$, $P_2$ . . . ).

Subsequently, a description will be given in more detail of the tire vulcanization mold assembly with reference to FIGS. 3 to 5.

The split mold unit is comprised of an upper side mold 100, a lower side mold 101, a tread mold 102 segments 103 to which the tread mold 102 is fitted, and an outer ring 104 which enables the segments 103 to swing.

The upper side mold 100 is arranged so that is can go up and down relatively with respect to a plate 105, and is driven by an upper center mechanism 23 which is briefly shown. An outer ring 104 is coupled to the upper plate 105 by bolts or the like.

A flange 105a is disposed in the outer peripheral portion of the upper plate 105. A lock ring 106 is rotatably engaged onto the flange 105a, and a lower portion 106a of the ring 106 is has a toothed-surface which can be engaged with the teeth of a lower flange 107a of a lower plate 107.

The lower plate 107 is guided by rollers 115 and 116 disposed on the base 1 and fixed onto the base 1 at a predetermined position by a known fixing unit (not shown).

The lower side mold 101 is engaged to a pressure plate 108. A center cylindrical portion 108a of the pressure plate 108 extends into a center pen portion 107b of the above lower plate 107 so as to guide up and down. A rod 109 hung from an appropriate place of the pressure plate 108 is assembled so as to bias the pressure plate 108 downwardly by means of a spring 110.

A stopper 111 is disposed between the lower plate 107 and the pressure plate 108 so that the downward movement of the rod 109 is regulated to an appropriate amount by the stopper 111.

That appropriate amount is to an amount which provides a minimum gap necessary for rotating the lock ring 106 when the pressure plate 108 goes down and is still located on the stopper 111. It is needless to say that the amount is determined also in accordance with the thermal expansion amount of the mold installed therein.

A block 112 having a T-groove is defined in an appropriate portion on the lower surface of the lower plate 107, and the block 112 is detachably engaged with an upper flange 113a of a pressurizing cylinder 113.

The T-groove of the block 112 is directed so that the movement of the tire vulcanizing mold assembly M is not obstructed by the pressurizing cylinder 113.

A rod portion 113b, which is an output shaft of the pressurizing cylinder 113, is arranged so as to abut against the pressure plate 108 through a through-hole 107b of the lower plate 107 when the rod portion 113b is extended and so as not to obstruct the movement of the tire vulcanizing mold assembly when the rod portion 113b is drawn back.

Also, the lower end portion of the pressurized cylinder 113 is supported on the base 1 by an elastic body 114 such as a spring.

With such a structure, when the rod 113b of the pressurizing cylinder 113 is in the drawn-in state, the pressurizing cylinder 113 does not obstruct the movement of the tire vulcanizing mold assembly as shown in the right half of FIG. 3. When the mold is pressed, a reaction force is transmitted from the flange 113a to the lower plate 107 through the block 112, and when the lock ring 106 is in a coupling state, then the mold installed therein is pressed and closed.

An arm 106a is projected from an appropriate portion of the lock ring 106, and a roller 106b is disposed in the top portion of the arm 106a. A block 118 which is movable by a cylinder 117 is disposed at an appropriate portion of the base 1 side, and the roller 106b is inserted into the concave portion of that block 118.

Therefore, the roller 106b of the lock ring 106 of the tire vulcanizing mold assembly M, which enters while being guided by the roller 115 can be engaged with the block 118, and when cylinder 117 is driven in the engagement state, the ring 106 rotates through the roller 106b in such a manner that the teeth portion 106a of the above ring and the teeth portion 107a of the lower plate 107 can be released from being engaged.

Then, a description will be given in more detail of the operation of the above-mentioned tire vulcanizing mold assembly.

(1) The tire vulcanizing mold assembly M is conveyed from a mold exchange place (not shown) to the tire vulcanizer through a known method.

(2) In this situation, an output shaft of the pressurizing cylinder (pressurizing unit) 113 at a place where the tire vulcanizing mold assembly M is located is completely drawn back. Also, the engagement portion stands in a floating state which is convenient to the entrance of the tire vulcanizing mold assembly M refer to the right half of FIG. 3 (and the right half of FIG. 5).

(3) The tire vulcanizing mold assembly is stopped at a predetermined position and fixed there through a known method. In this situation, the rotation driver section of the lock ring 106 is also engaged (refer to FIG. 4).

(4) The mold opening/closing unit 3 is moved to a position of the received tire vulcanizing mold assembly M and coupled to the latter, and the rotation drive mechanism of the lock ring 106 is operated to complete the preparation to open the tire vulcanizing mold assembly M.

(5) Subsequently, the tire vulcanizing mold assembly M is opened, and a crude tire is supplied thereto before the tire vulcanizing mold assembly M is closed.

(6) The lock ring 106 is moved to a coupling state, and the output shaft of the pressurizing cylinder 113 is actuated in an extended direction so that the tire vulcanizing mold assembly M is pressed. The engagement portion of the pressurizing cylinder 113 is also moved to an engagement state (refer to the left half of FIG. 3 and the left half of FIG. 5 so that the tire vulcanizing mold assembly M is pressed and closed.

(7) When the pressing operation due to the pressurizing cylinder 113 starts, the mold opening/closing unit 3 releases the coupling, and moves to another mold position to perform a predetermined work. Thereafter, the mold opening/closing unit returns to the above mold position at an appropriate time.

(8) After the vulcanization has been finished, the output shaft of the pressurizing cylinder 113 is slightly drawn back from that in the pressurized state so that the pressing of the closed tire vulcanizing mold assembly M is released, and the lock ring 106 returns to a rotatable state.

(9) The lock ring 106 rotates and is coupled to the mold opening/closing unit 3. The tire vulcanizing mold assembly M is opened so that the take-out of a finished tire and the supply of a crude tire are sequentially conducted.

(10) After the crude tire has been supplied thereto, the tire vulcanizing mold assembly M is closed, and the lock ring 106 is again made in the coupling state. The output shaft of the pressurizing cylinder 113 is extended so that the tire vulcanizing mold assembly M is pressed. The engagement portion of the pressurizing cylinder 113 return to the engagement state so that the tire vulcanizing mold assembly M is pressed and closed.

Thereafter, the same operation is repeated, and when the tire vulcanizing mold assembly M or bladder is exchanged, the output shaft of the pressurizing cylinder 113 is completely drawn back, and removed before being conveyed.

Since the operation of the tire vulcanizing mold assembly (popularly named "two-piece mold or two-division mold built-in type tire vulcanizing mold assembly") shown in FIG. 5 is entirely identical with the above-mentioned operation, its detailed description will be omitted.

According to the above-mentioned tire vulcanizing mold assembly, (1) even though a split mold unit is not newly prepared in the conventional tire vulcanizing mold, the tire vulcanizer which has already been proposed by this applicant can be used. (2) When removing and moving from the tire vulcanizing position for the exchange of the mold or bladder, etc., the drive unit of the lock ring and the pressurizing unit automatically release the coupling, resulting in an advantage because the exchange work is automated.

A description will be given of the tire vulcanizing mold assembly in accordance with the present invention with reference to FIGS. 6 to 11 which show other embodiments (second and third embodiments).

Figure 6:
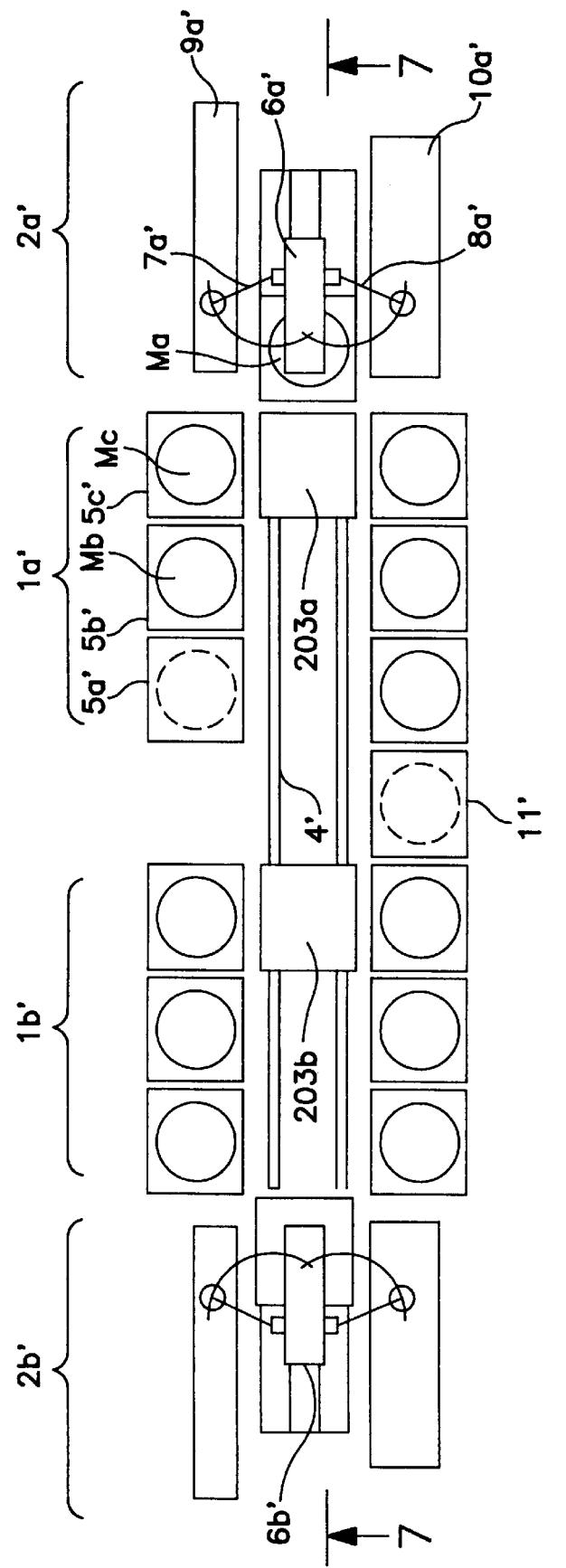
FIG. 6 is a plan view showing another example of the tire vulcanizer.

FIG. 6 is a plan view showing one example of the tire vulcanizer.

Figure 7:
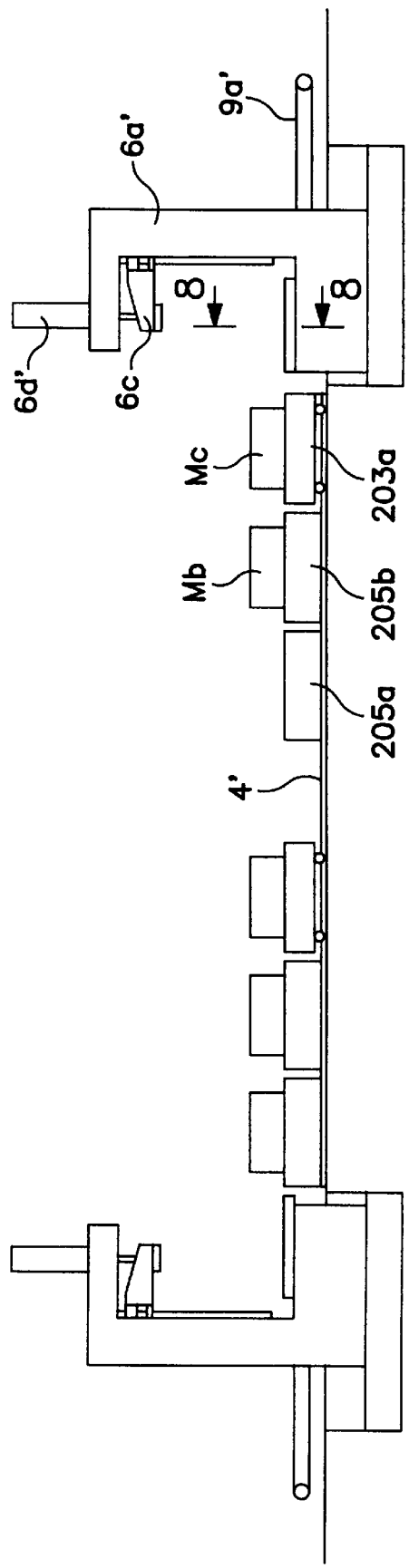
FIG. 7 is a side view showing the tire vulcanizer taken along a line 7—7 in FIG. 6.

FIG. 7 is a side view showing the tire vulcanizer taken along a line a—a in FIG. 6.

Figure 8:
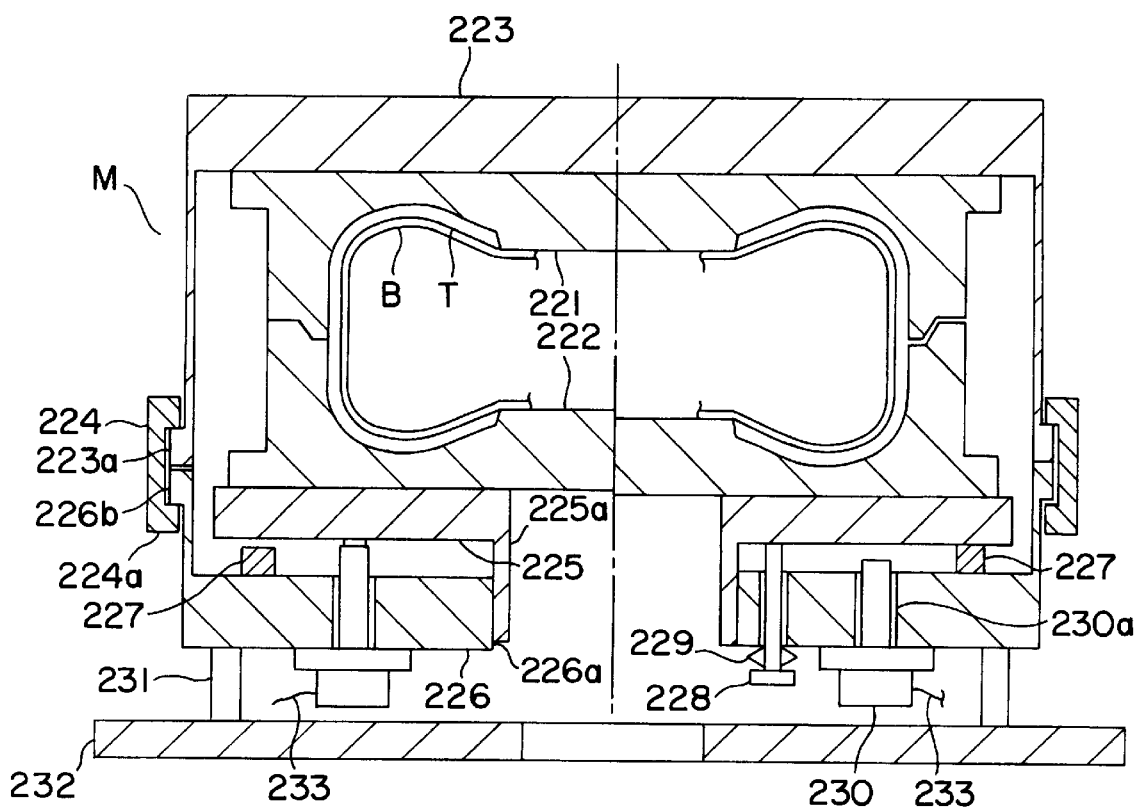
FIG. 8 is vertical cross-sectional side view showing another embodiment (second embodiment) of the tire vulcanizing mold assembly in accordance with the present invention, which is taken along a line 8—8 in FIG. 7.

FIG. 8 is a vertical cross-sectional side view showing a second embodiment of the tire vulcanizing mold assembly in accordance with the present invention, in which the left half of FIG. 8 shows a state in which vulcanization is being conducted with the application of a predetermined mold fastening force onto the tire vulcanizing mold assembly whereas the right half thereof shows a state of the tire vulcanizing mold assembly immediately after the mold is closed by the mold opening/closing unit but before a predetermined mold fastening is started.

Figure 9:
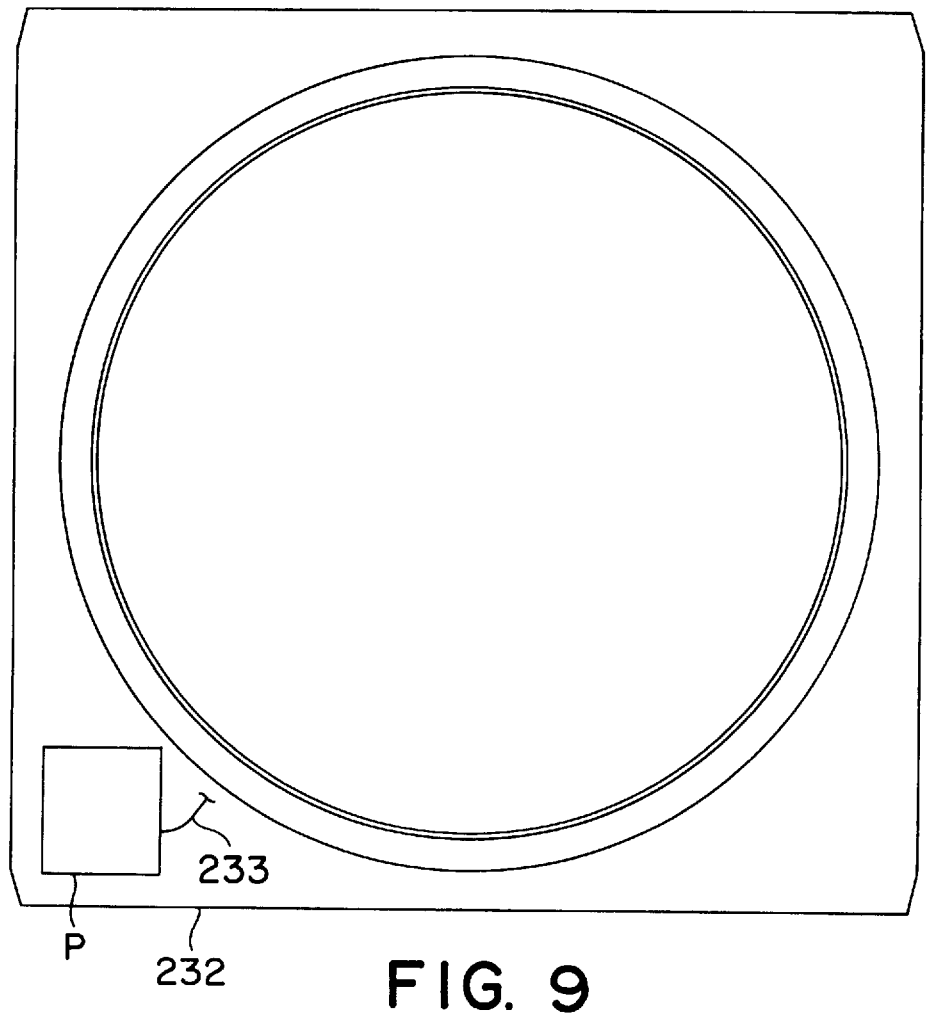
FIG. 9 is a plan view showing the tire vulcanizing mold assembly.

FIG. 9 is a plan view showing the tire vulcanizing mold assembly.

Figure 10:
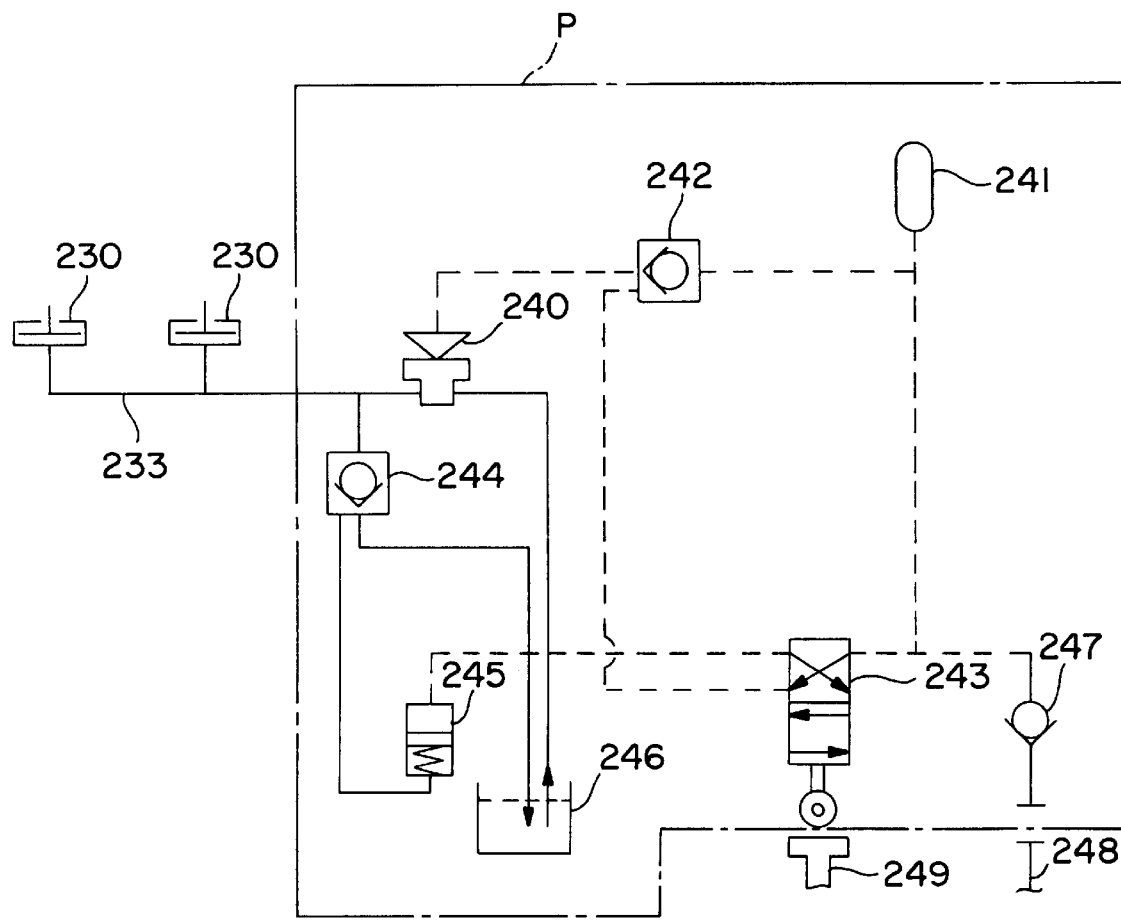
FIG. 10 is a systematic diagram showing a pressurization control unit shown in FIG. 9.

FIG. 10 is a systematic diagram showing a pressurization control unit P shown in FIG. 9.

Figure 11:
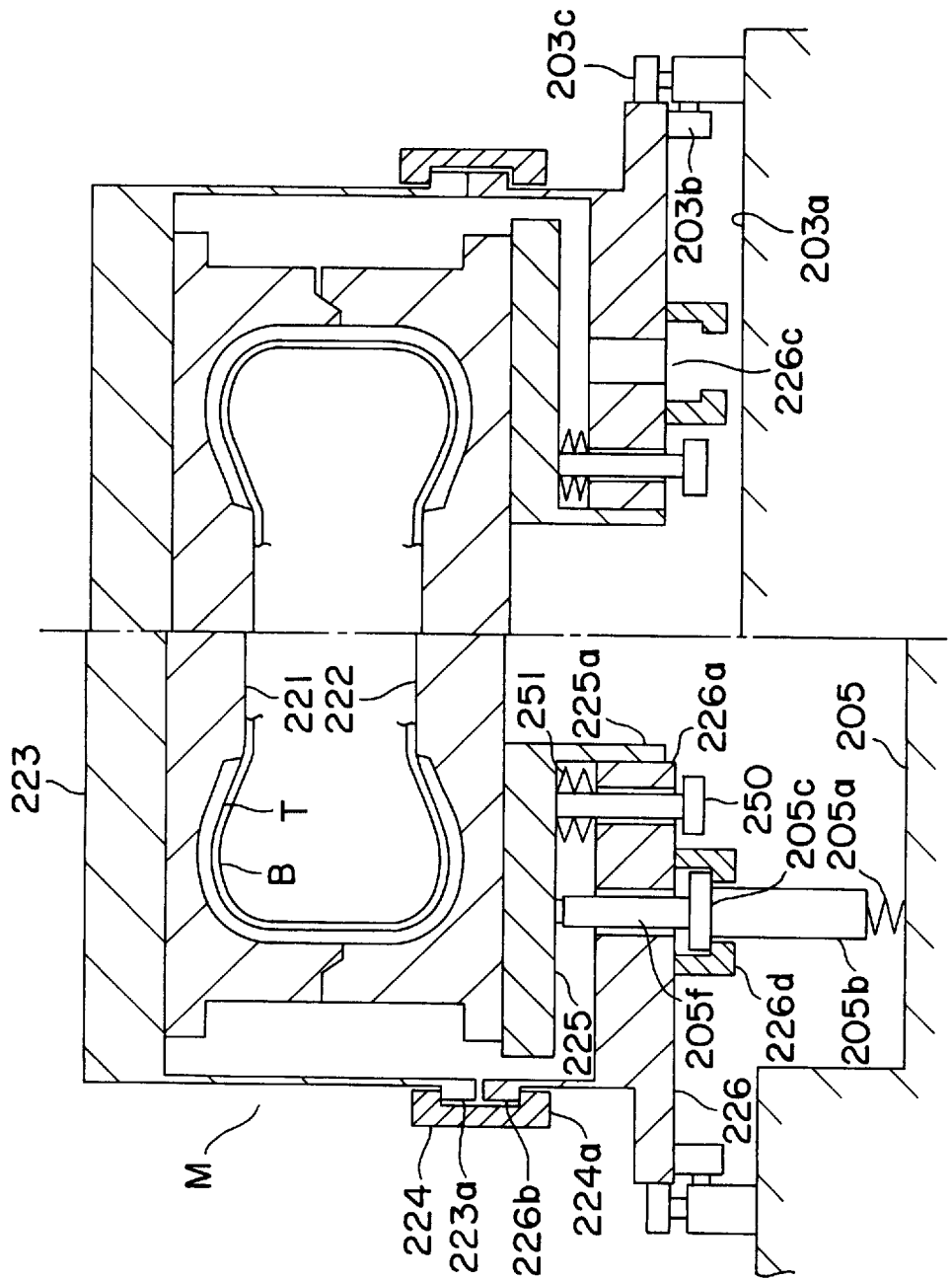
FIG. 11 is a vertical cross-sectional side view showing a still another embodiment (third embodiment) of the tire vulcanizing mold assembly.
Figure 12:
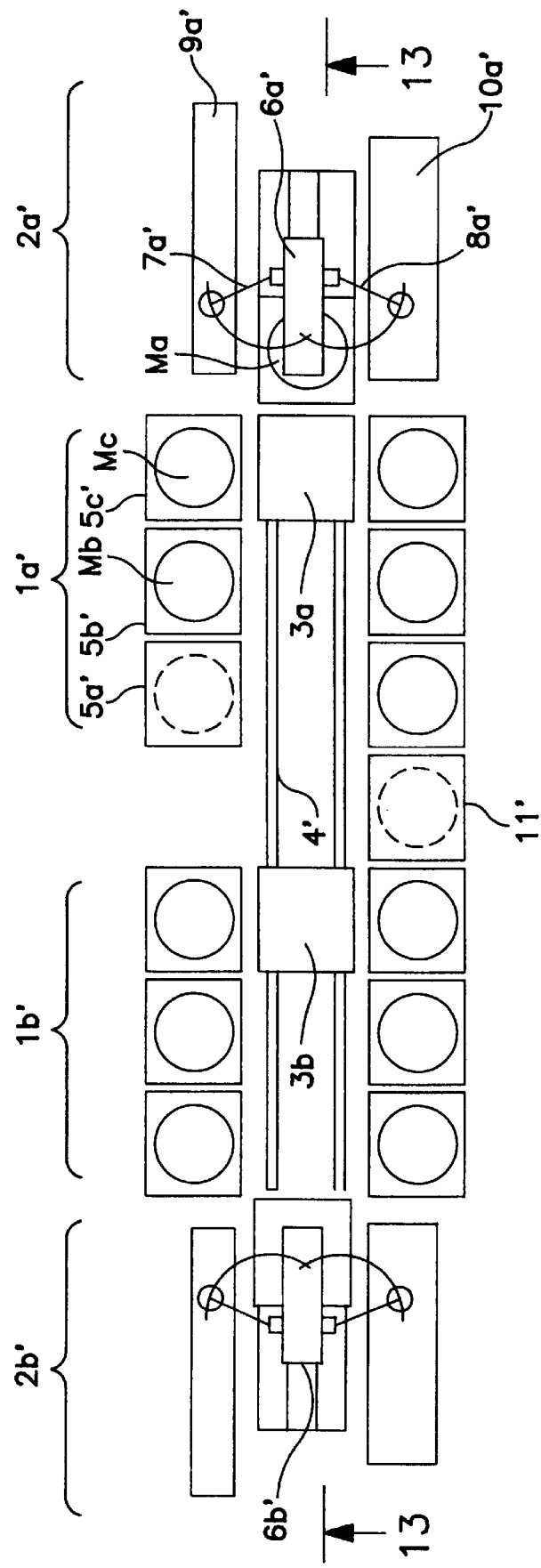
FIG. 12 is a plan view showing one example of a tire vulcanizer.
Figure 13:
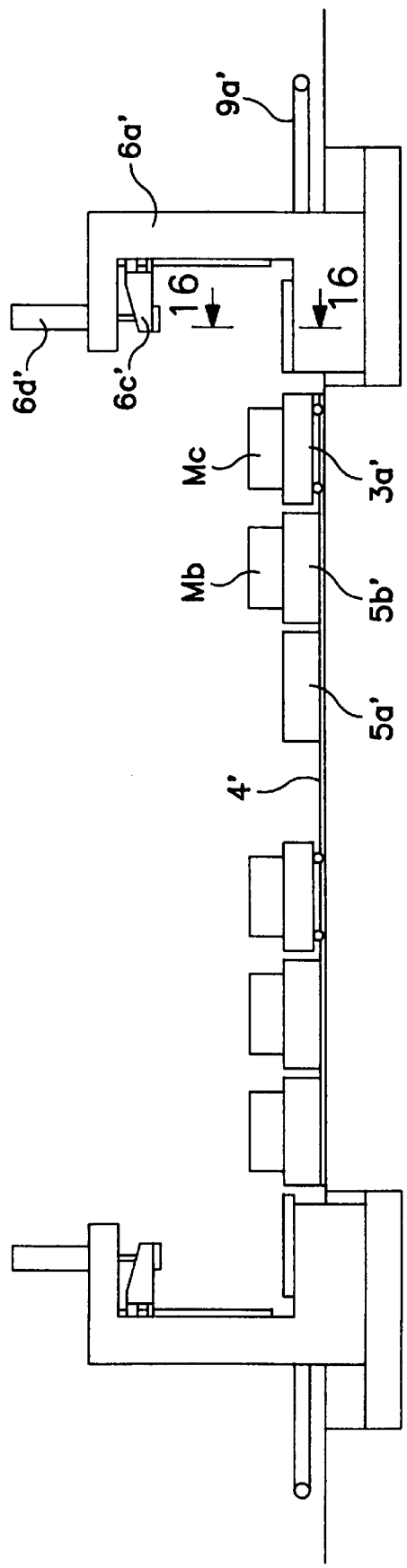
FIG. 13 is a vertical cross-sectional front view showing the tire vulcanizer taken along a line 13—13 in FIG. 12.
Figure 14:
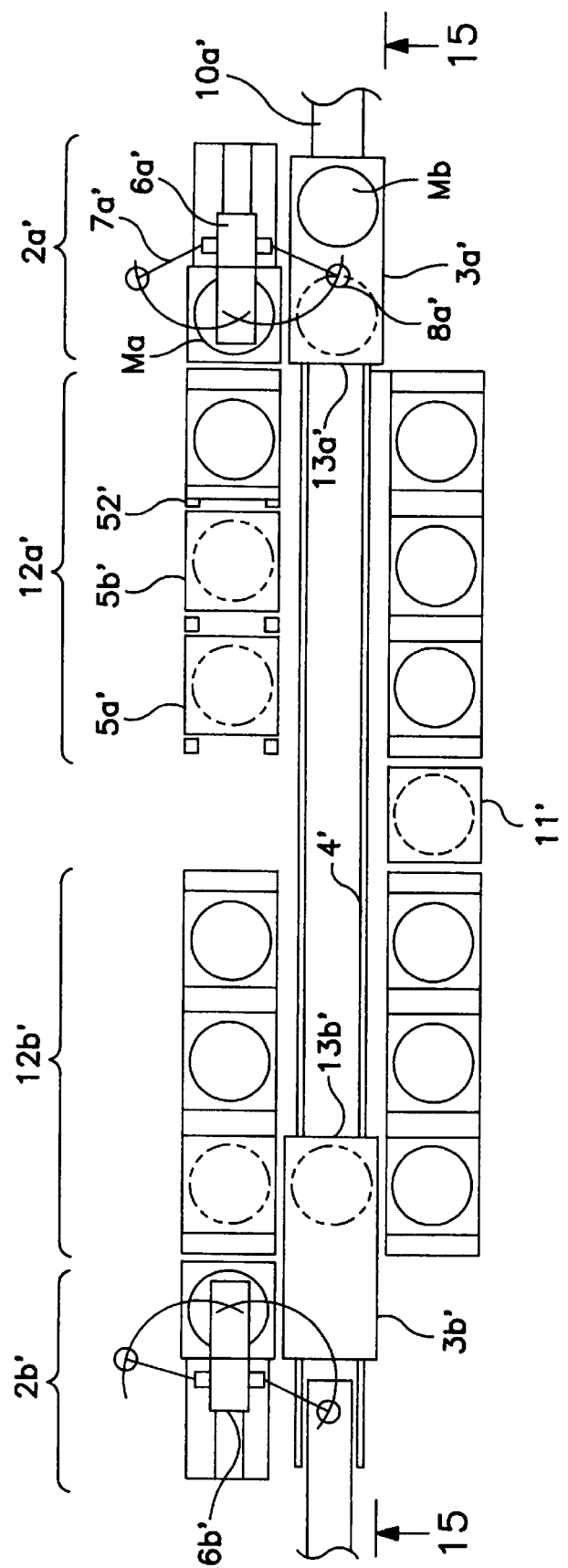
FIG. 14 is a plan view showing another example of the tire vulcanizer.
Figure 15:
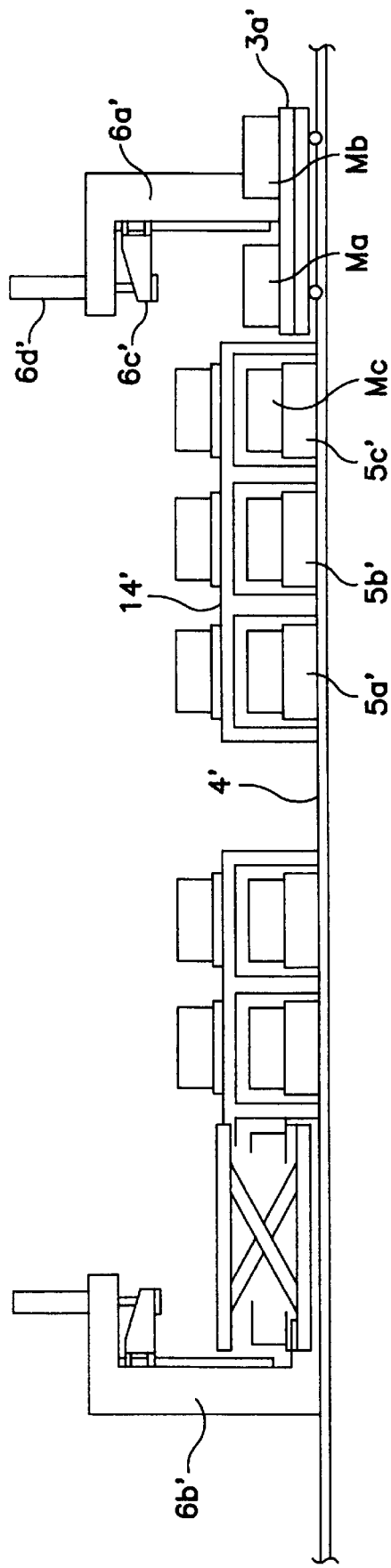
FIG. 15 is a vertical cross-sectional front view showing the tire vulcanizer taken along a line a 16—16 in FIG. 14.
Figure 16:
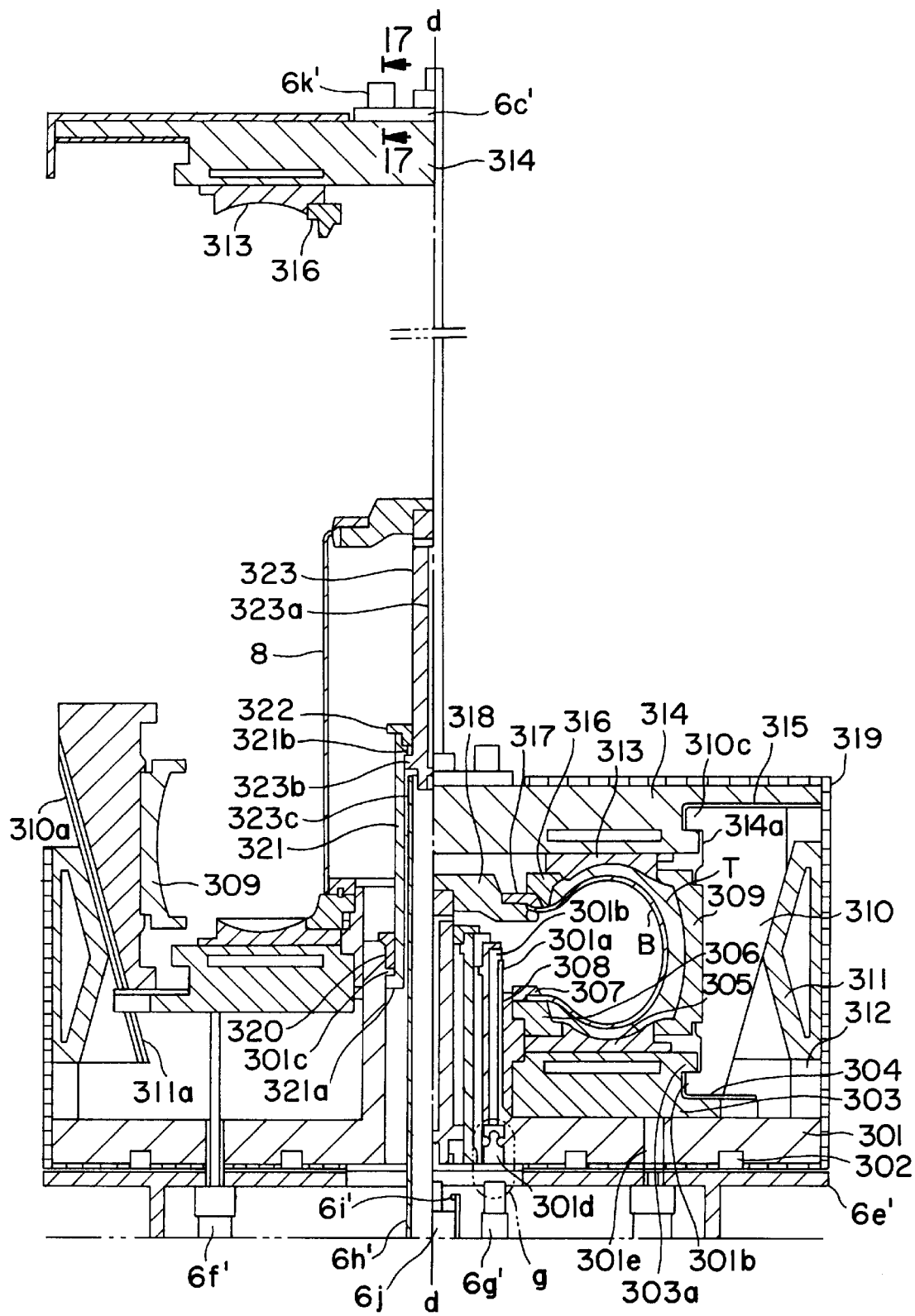
FIG. 16 is a vertical cross-sectional front view showing the tire vulcanizer taken along a line 16—16 in FIG. 12.
Figure 17:
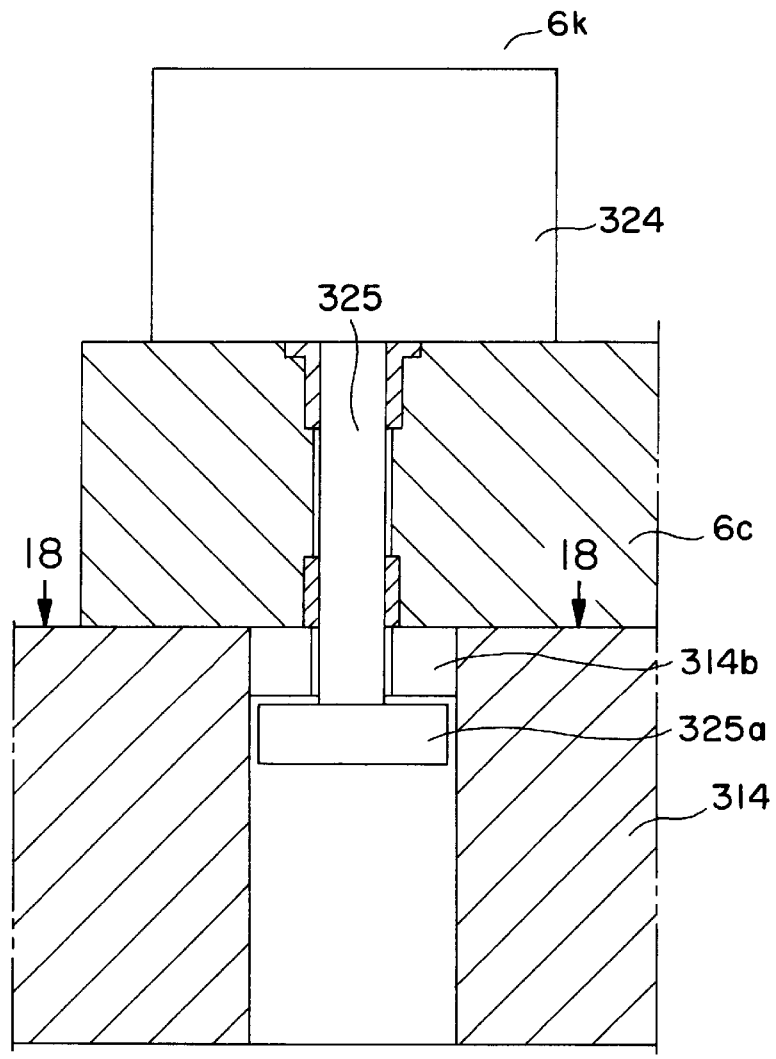
FIG. 17 is a vertical cross-sectional side view showing the tire vulcanizer taken along a line 17—17 in FIG. 16.
Figure 18:
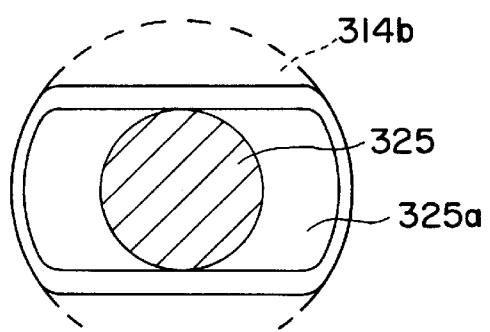
FIG. 18 is a horizontal cross-sectional plan view showing one example of upper-heating-plate detachably engaging means taken along a line 18—18 in FIG. 17.
Figure 19:
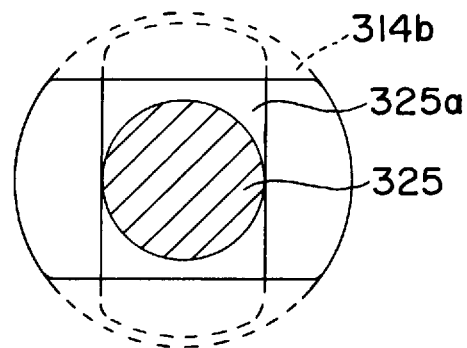
FIG. 19 is a horizontal cross-sectional plan view showing a coupling state of the upper-heating-plate detachably engaging means taken along a line 18—18 in FIG. 17.
Figure 20:
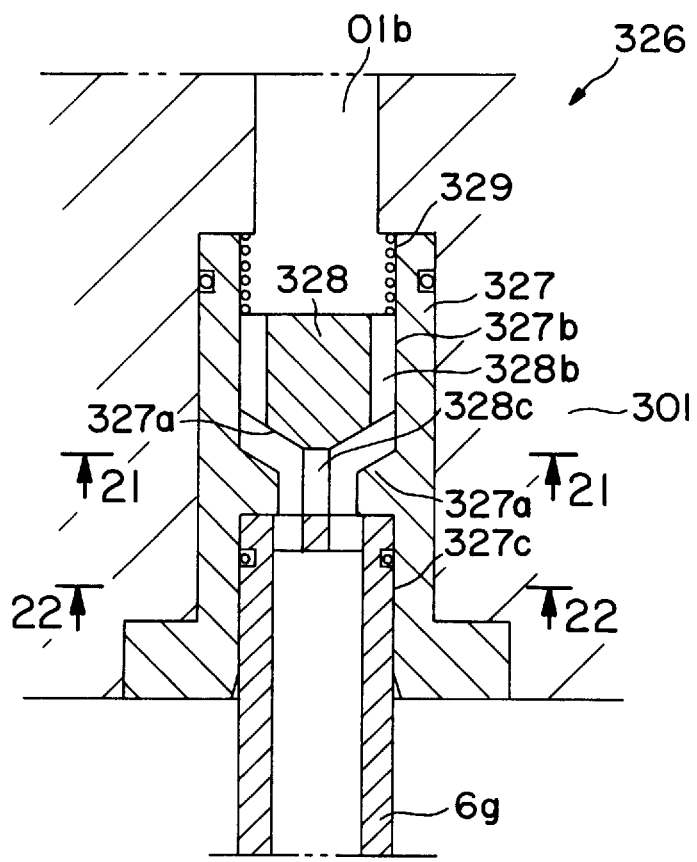
FIG. 20 is an enlarged vertical cross-sectional side view showing the tire vulcanizer indicated by an arrow g.
Figure 21:
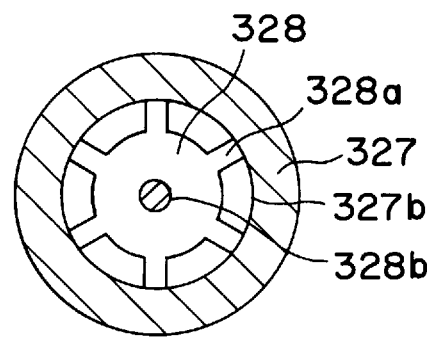
FIG. 21 is a horizontal cross-sectional side view showing the tire vulcanizer taken along a line 21—21 in FIG. 20.
Figure 22:
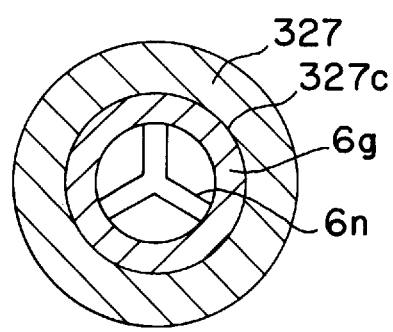
FIG. 22 is a horizontal cross-sectional plan view showing the tire vulcanizer taken along a line 20—20 in FIG. 20.
Figure 23:
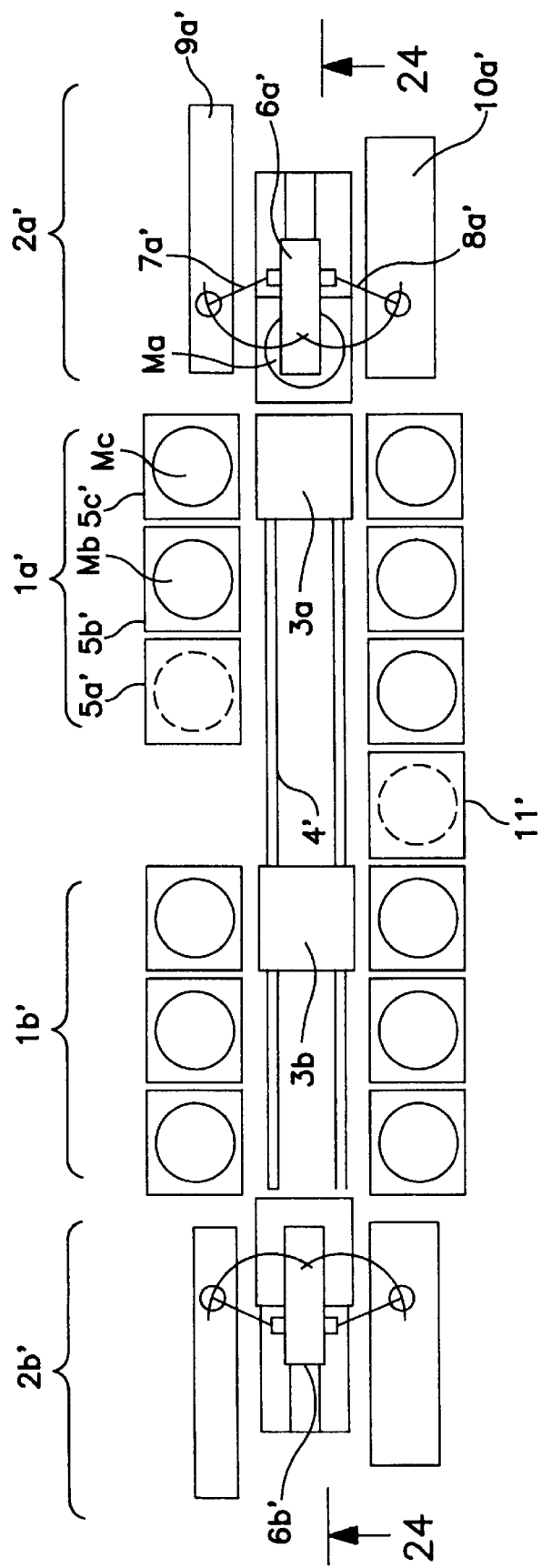
FIG. 23 is a plan view showing one example of the tire vulcanizer.
Figure 24:
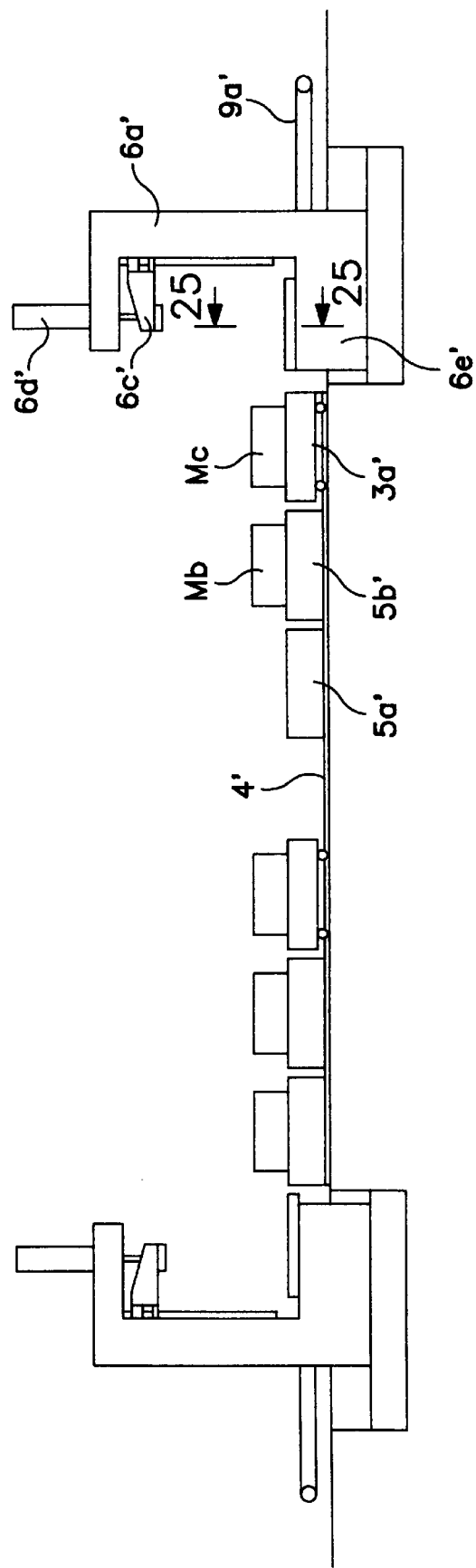
FIG. 24 is a side view showing the tire vulcanizer taken along a line 24—24 in FIG. 23.
Figure 25:
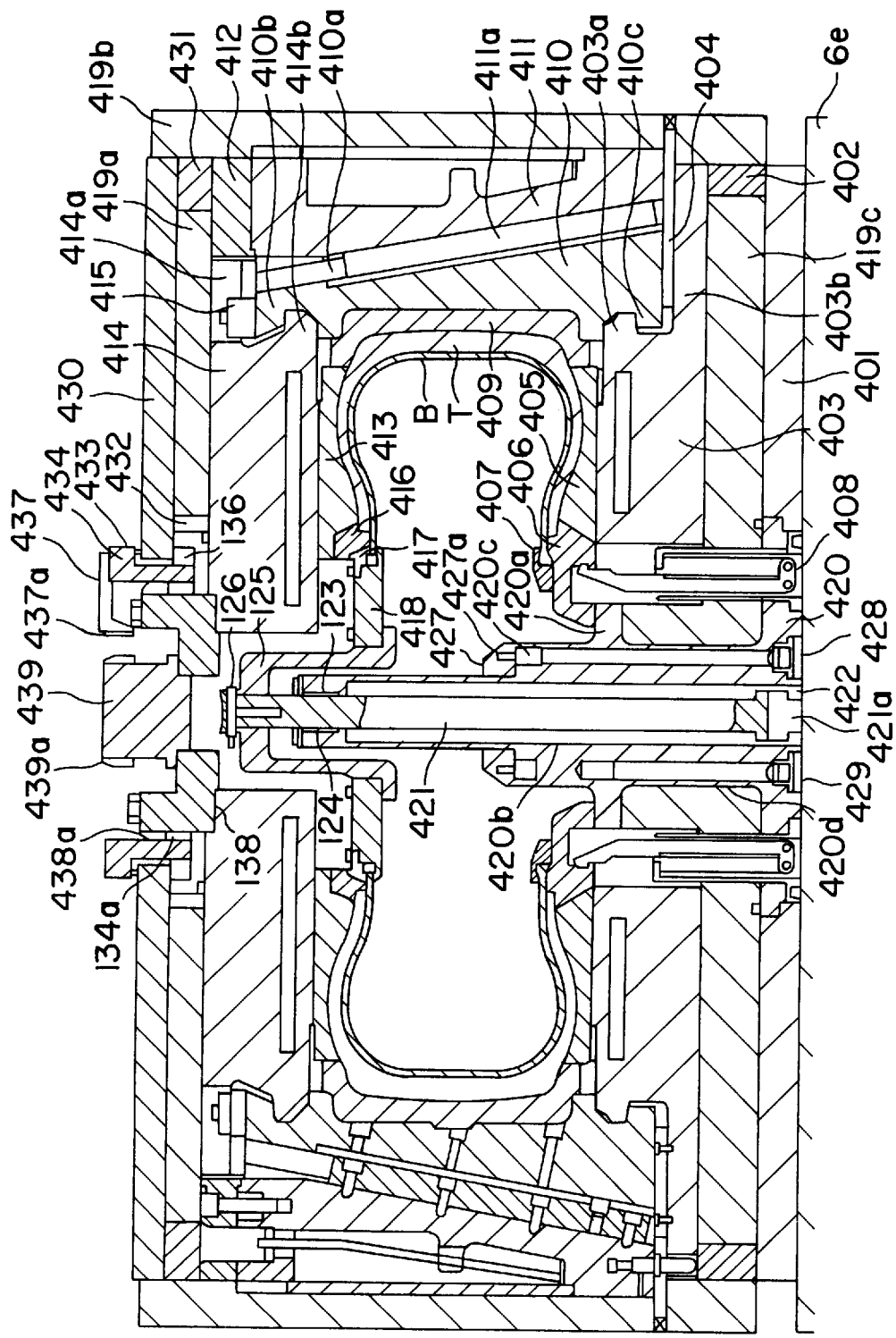
FIG. 25 is a vertical cross-sectional front view showing the above tire vulcanizer split mold unit taken along a line 25—25 in FIG. 24.
Figure 26:
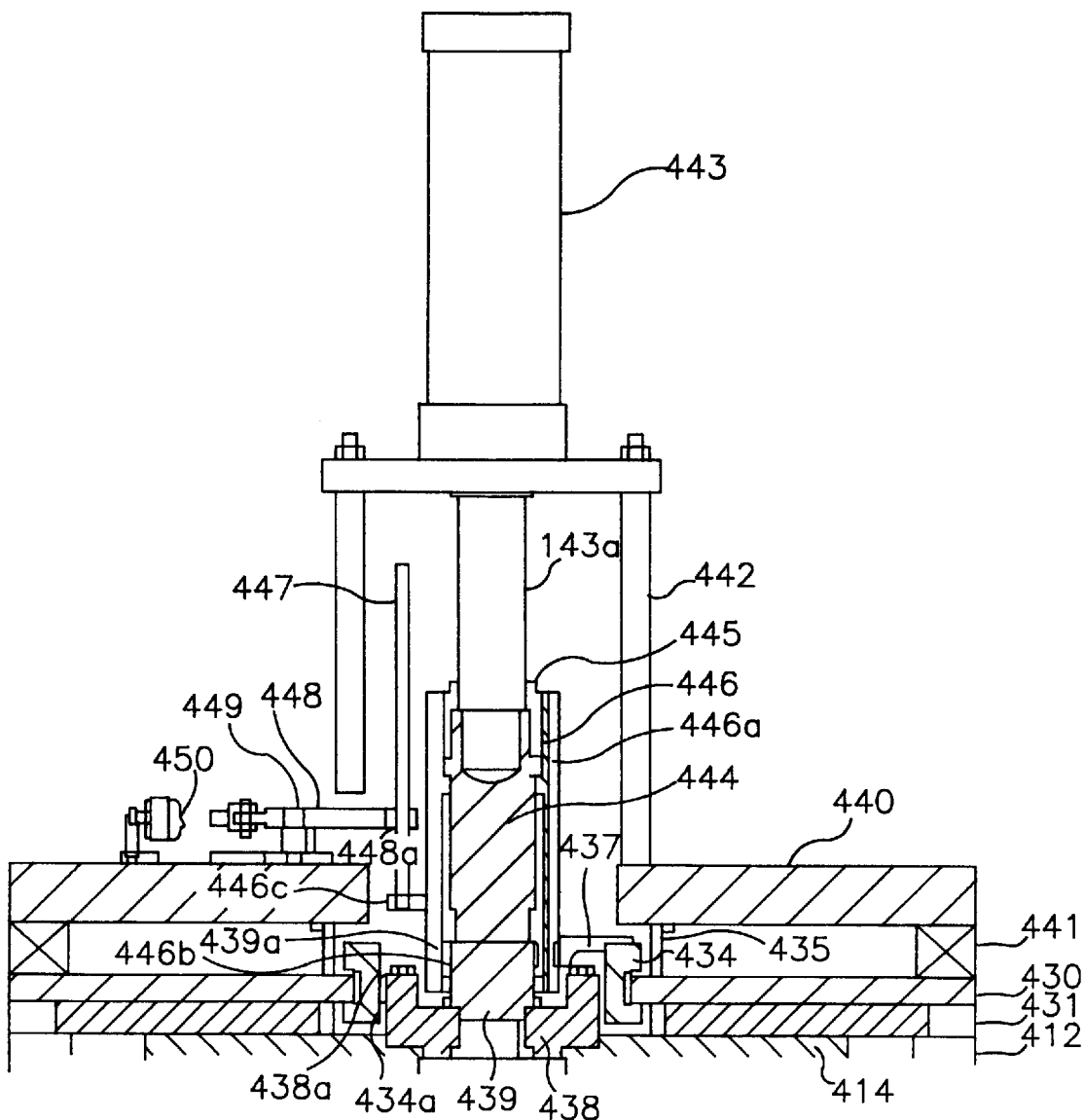
FIG. 26 is a vertical cross-sectional front view showing one example of the above tire vulcanizer split mold unit and the mold opening/closing unit, taken along a line 25—25 in FIG. 24.
Figure 27:
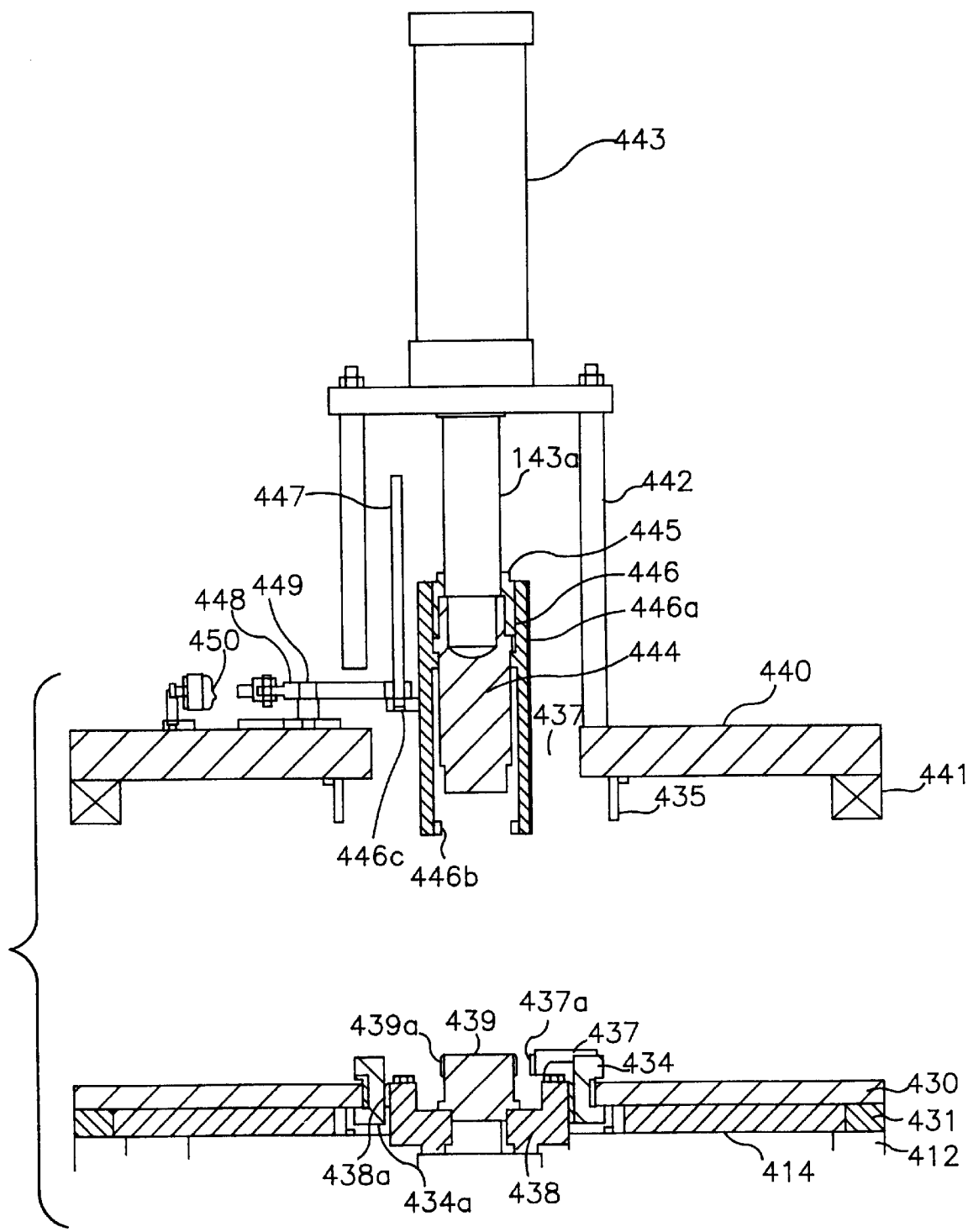
FIG. 27 is a vertical cross-sectional front view showing another example of the above tire vulcanizer split mold unit and the mold opening/closing unit, taken along a line a—a in FIG. 24.
Figure 28:
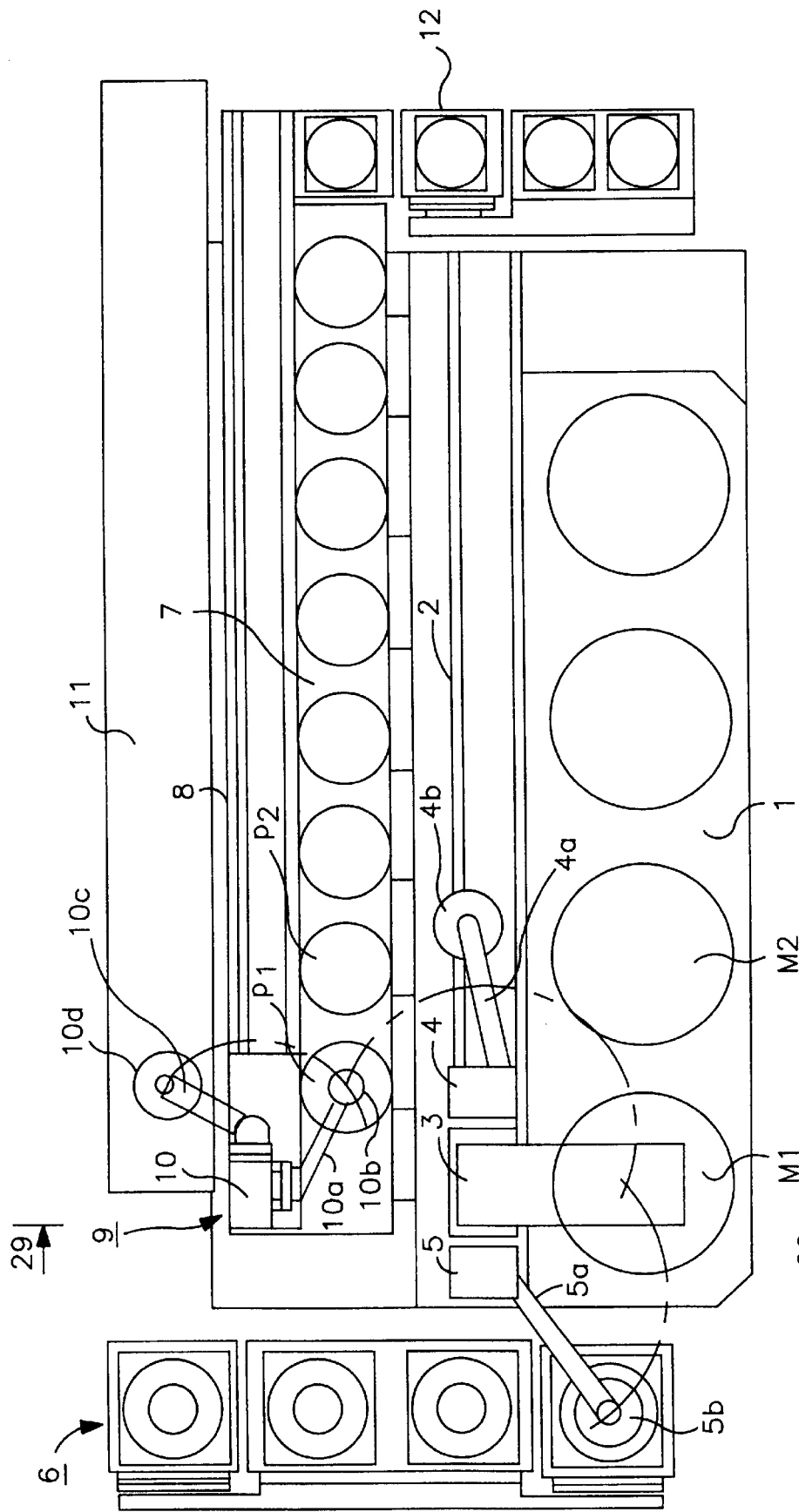
FIG. 28 is a plan view showing one example of the tire vulcanizer.
Figure 29:
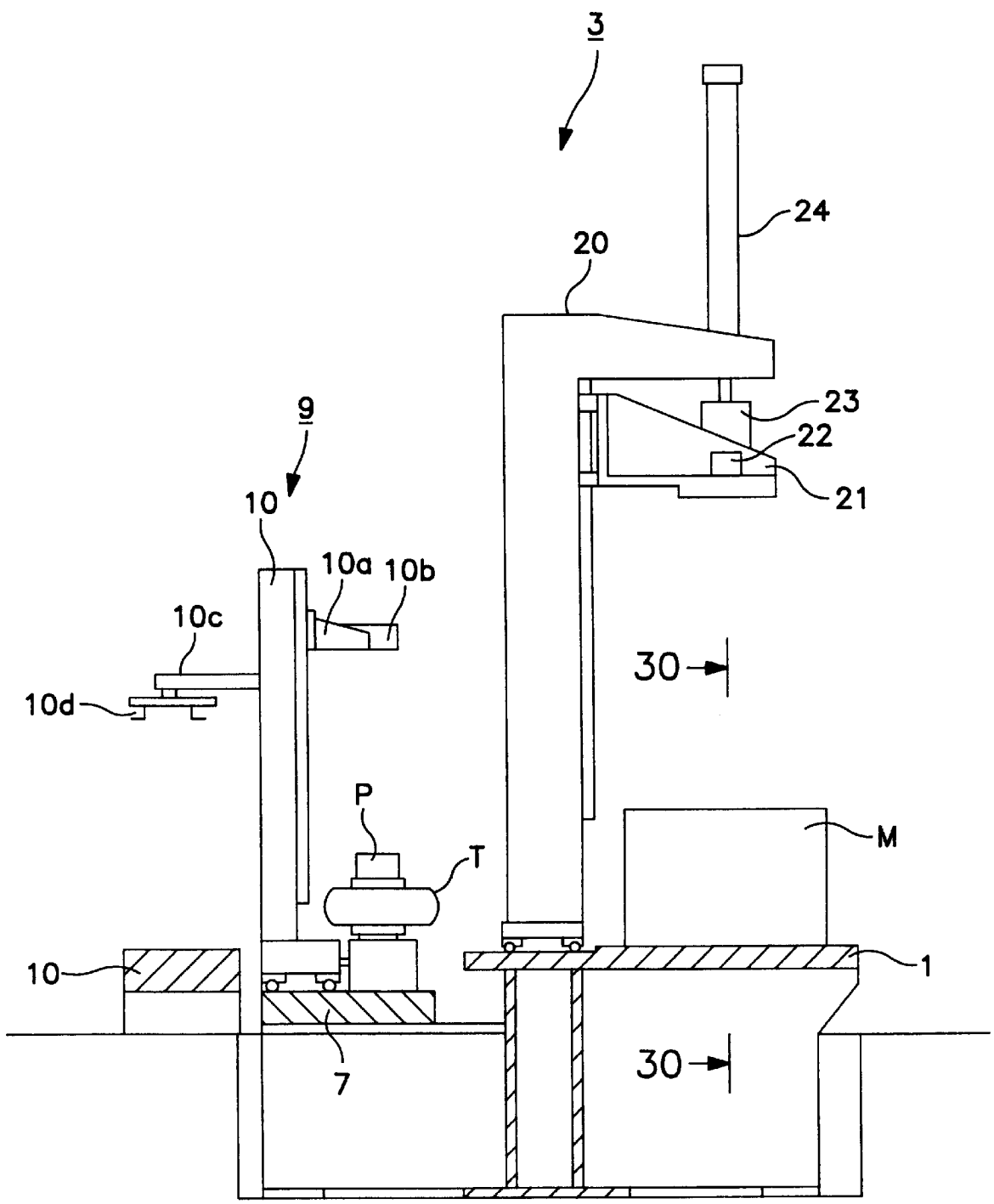
FIG. 29 is a front view showing the tire vulcanizer taken along a line 29—29 in FIG. 28.
Figure 30:
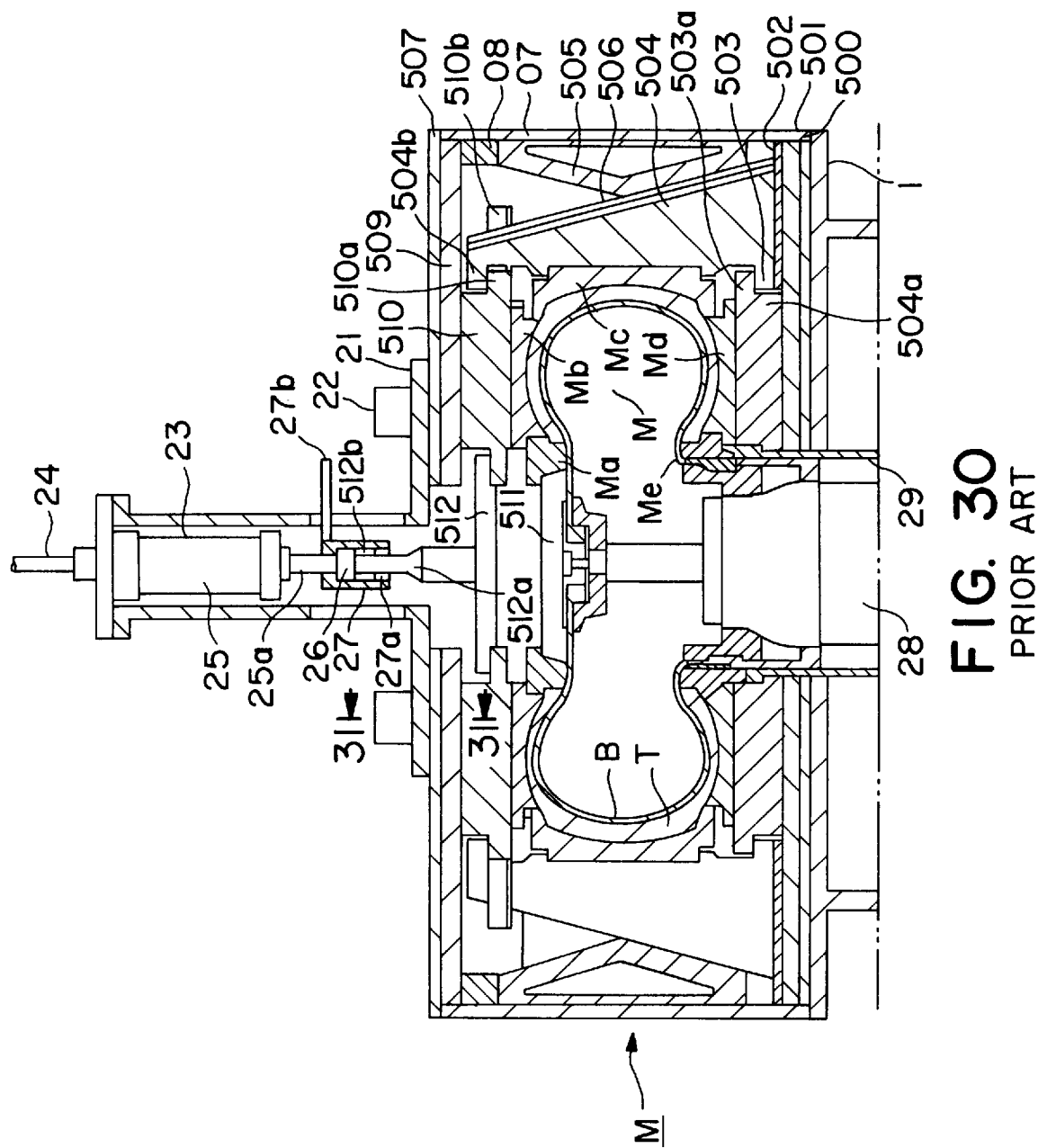
FIG. 30 is a vertical cross-sectional side view showing the tire vulcanizer taken along a line 30—30 in FIG. 29.
Figure 31:
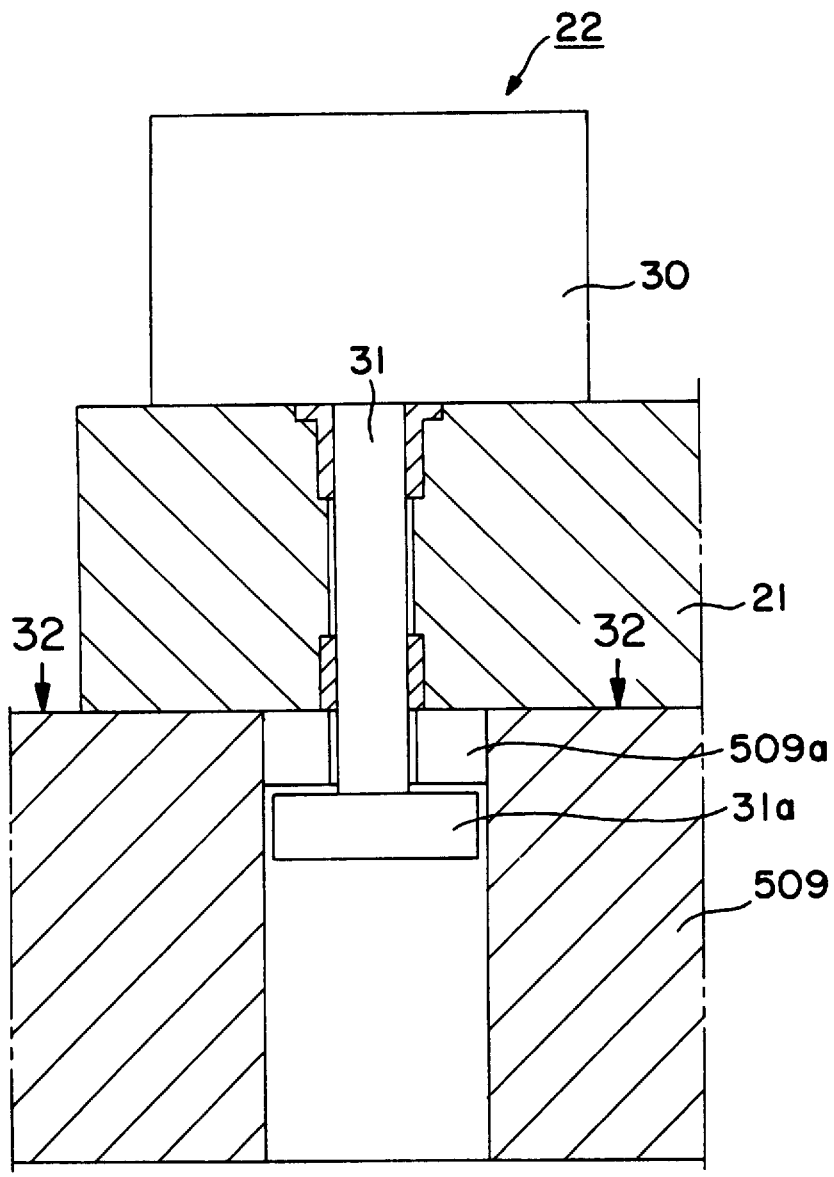
FIG. 31 is a vertical cross-sectional side view showing the tire vulcanizer taken along a line 31—31 in FIG. 30.
Figure 34:
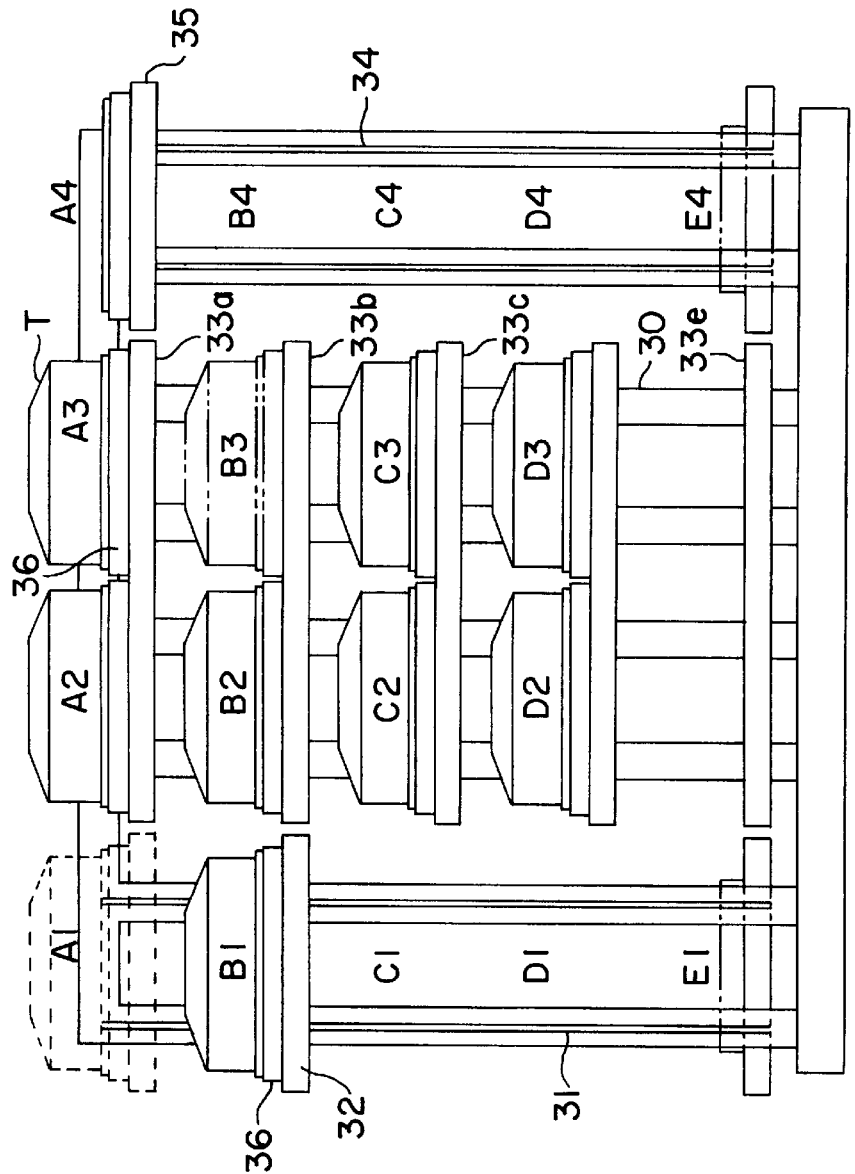
FIG. 34 is a front view showing an unvulcanized tire supply unit taken along a line 34—34 in FIG. 28.
Figure 32:
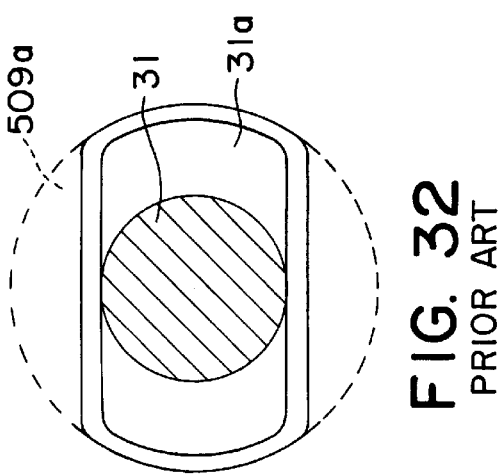
FIG. 32 is a horizontal cross-sectional plan view showing one example of the mold detachably engaging unit taken along a line 32—32 in FIG. 31.
Figure 33:
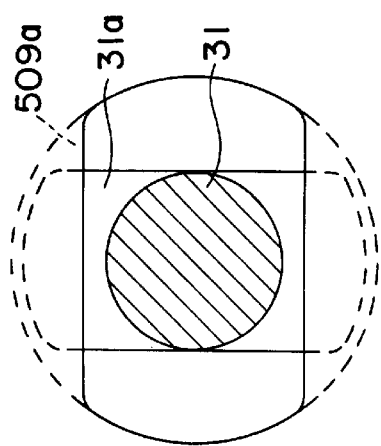
FIG. 33 is a horizontal cross-sectional plan view showing another example of the mold detachably engaging unit taken along a line 32—32 in FIG. 31.

FIG. 11 is a vertical cross-sectional side view showing a third embodiment of the tire vulcanizing mold assembly in accordance with the present invention.

First, the whole tire vulcanizer will be described with reference to FIGS. 6 and 7.

Vulcanizing stations 1' (1a' and 1b') include a plurality of mold tables 5' (5a', 5b', 5c', ... ) on which a plurality of tire vulcanizing molds (Ma, Mb, Mc, ... ) are mounted. Each of the mold tables 5 is equipped with mold moving means (for example, a cylinder-driven pusher) not shown, and as occasion demands, heated and pressurized medium supplement means, a piping or the like.

Mold opening/closing stations 2' (2a' and 2b') are comprised of mold opening/closing units 6' (6a' and 6b') which are similar to a known tire vulcanizer, a known unloader 7a' which takes out a vulcanized tire from the tire vulcanizing mold, and a known loader 8a' which places an unvulcanized tire in the tire vulcanizing mold. As occasion demands, the mold opening/closing stations 2 are equipped with a vulcanized tire carrier conveyor 9a', an unvulcanized tire rack 10a' or the like.

A mold carrier truck is comprised of rails 4'0 fixed onto a floor, known trucks 3' (3a' and 3b') which are guided by the rails 4' and travel by the operation of drive means not shown. A mold exchange station includes a mold exchange table 11' which performs the exchange of a tread mold, a side wall mold or the like within the tire vulcanizing mold and, which accompanies the change in the specification of the vulcanized tire, the exchange of a bladder which is a consumable good, and so on. It should be noted that, as occasion demands, a tire vulcanizing mold preheating chamber may be provided. Also, the mold exchange table 11 may be merely constituted by a table on which the tire vulcanizing mold is temporarily mounted, or the tire vulcanizing mold preheating chamber so that the tire vulcanizing mold is transported onto another place by a forklift or the like to perform the exchange of parts within the mold.

Subsequently, a description will be given of the tire vulcanizing mold assembly (second embodiment) in accordance with the present invention with reference to FIGS. 8 to 10.

A lower mold 222 of FIG. 8 is fixed onto a pressure plate 225 through a known method. Reference numeral 226 denotes a lower plate which guides a center cylindrical portion 225a of the above pressure plate 225 by an inner peripheral portion 226a thereof so as to go up and down.

An outer peripheral portion 226b of the above lower plate 226 is a toothed flange which can be engaged with a toothed flange of a lower end 224a of a lock ring 224.

A stopper 227 is disposed between the lower plate 226 and the pressure plate 225. When a rod 230a of a pressure cylinder 230, disposed in the lower plate 226, is drawn back by a plurality of rods 228 which are hung from the pressure plate 225 and a plurality of springs 229, the pressure plate 225 is designed so as to be still disposed on the stopper 227.

With such a structure, when the mold is closed by the mold opening/closing unit 226 while the bladder B is inserted into the tire T in a known procedure and, when the flange 223a abuts against the flange 226b, a gap is defined between the lock ring 224 and the flange 226b as shown in the right half of FIG. 8 with the result that the lock ring 224 is rotatable.

Then, when the level of the stopper 227 becomes appropriate, a gap between mating portion of the upper mold 221 and the lower mold 222 of the two-division mold shown is of an appropriate amount, and the lock ring 226 is locked through a known method. Thereafter, when the rod 230a of the pressurizing cylinder 230 is actuated in the extension direction, the between the molds 221 and 222 disappears, and the molds 221 and 222 are pressed upwardly with a desired mold fastening force.

Then, a high-temperature and high-pressure medium is introduced into the tire T through the bladder B before starting the vulcanization.

The mold fastening operation due to the above pressurizing cylinder 230 will be described below.

The members 221 to 230 are mounted on a base plate 232 through a spacer 231 at an appropriate place on the lower plate 226, and a pressurization control unit P is disposed at an appropriate place on the base plate 232. The pressurization control unit P and the pressurizing cylinder 230 are coupled to each other through a conduit 233.

Subsequently, a description will be given of the above pressurization control unit P with reference to FIG. 10.

Reference numeral 240 denotes an air-to-oil pressure convertor, which is a known unit which generates a high hydraulic pressure from the reciprocation due to air pressure, and which is driven by an air receiver 241, a pilot check valve 242 and a mechanical valve 243.

Reference numeral 244 denotes a pilot check valve, which is driven by the mechanical valve 243 and an air-to-oil convertor 245.

Reference numeral 246 denotes an oil tank, and 247 is a quick coupler type check valve used when driven air is supplied to the air receiver 241.

Reference numeral 248 denotes a conduit coupled to the check valve 247. The conduit 248 and a push rod 249 which drives the mechanical valve 243 are disposed on the mold opening/closing station 2' (2a', 2b'), the mold carrier truck 3' (3a', 3b') or the vulcanizing station 5' (5a', 5b', 5c').

In a case in which the rod 249 and conduit 248 are disposed on the mold opening/closing station 2' position as one example, the operation of the pressurizing control unit P will be described.

While the mold manipulation is conducted by the mold opening/closing unit, the push rod 249 is pushed up, and the check valve 244 is opened by hydraulic pressure developed by the convertor 245. Oil within the cylinder 230 is returned to the tank 246 through the valve 244 by means of the rod 228 and spring 229 of the tire vulcanizing mold assembly with the result that the rod 230a of the cylinder 230 is drawn back.

After the mold closing has been finished, the lock ring 224 is moved to a locked state through a known method. Then, the rod 249 is drawn back so that the valve 243 is changed over, the valve 244 is closed and the valve 242 is opened. The air-to-oil pressure convertor 240 is actuated by air stored in the air receiver 241 in such a manner that the cylinder 230 is boosted and the mold is pressed and closed by a predetermined mold fastening force.

The supply of an air pressure source to the above air receiver 241 is enabled by coupling the conduit 248 at a required timing.

Then, a description will be given of the tire vulcanizing mold assembly (third embodiment) with reference to FIG. 11.

As to the same parts as those in the tire vulcanizing mold assembly (second embodiment) shown in FIG. 8, only the names are mentioned. Reference numeral 221 denotes an upper mold; 222 denoted a lower mold; 223 denotes an upper plate; 223a denotes a flange; 224 denotes a lock ring; 224a denotes a flange; 225 denotes a pressure plate; 225a denotes a central cylinder; 226 denotes a lower plate; 226a denotes a central hole; 226b denotes a flange; 250, a plurality of rods hung from the above pressure plate 225. A spring 251 is interposed between the pressure plate 225 and the lower plate 226 so that they are opposed to each other. The output of the spring 251 is an output which sufficiently resists an initial pressure which is supplied to the interior of the tire T immediately after the mold has been closed.

A through-hole 226c and a block 226d having a T-groove are disposed at an appropriate location on the lower plate 226.

An upper flange 205c of a pressurizing cylinder 205b which is supported through a spring 205a on the mold table 205 of the vulcanizing station can be engaged with the T-groove. Accordingly, when the molds 221 and 222 are pressed and closed by the spring 251 so as to be transferred through the guide rollers 203b and 203c on the carrier truck 203a onto the guide rollers 205d and 205e on the mold table 205, a rod 205f of the cylinder 205b is completely drawn back so that the flange portion 205c can pass in the T-groove by the spring 205a. As a result, the entrance of the mold is not obstructed. Also, after the mold has stopped at a predetermined position, when the cylinder rod 205f is extended, the cylinder rod 205f abuts against the pressure plate 225. Subsequently, the cylinder 205b goes down while crushing the spring 205a, and the flange portion 205c is engaged with the block 226d so that the molds 221 and 222 are fastened up to a predetermined fastening force.

After the vulcanization has been finished, the pressure applied to the pressurizing cylinder 205b is released so that the rod 205f is drawn back, and the engagement of the flange 205c and the block 226d are released, thereby being capable of moving the mold.

According to the above-mentioned tire vulcanizing mold assembly, the tire vulcanizer which has already been proposed by this applicant can be used even though a split mold unit is not newly prepared in the conventional tire vulcanizing mold.

According to the above-mentioned tire vulcanizing mold assembly, (1) even though a split mold unit is not newly prepared in the conventional tire vulcanizing mold, the tire vulcanizer which has already been proposed by this applicant can be used. (2) When removing and moving from the tire vulcanizing position for the exchange of the mold or bladder, etc., the drive unit of the lock ring and the pressurizing unit automatically release the coupling, resulting in an advantage that the exchange work is automated.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A tire vulcanizing apparatus comprising:

a transportable upper mold assembly having an outer peripheral portion terminating in an upper flange;

a lower plate having a through hole and an outer peripheral portion which terminates in a lower flange which opposes said upper flange;

a transportable lower mold assembly movably disposed relative to said lower plate;

a lock ring surrounding said upper and lower flanges, said lock ring being rotatably positioned on one of said upper and lower flanges and detachably engaged with the other of said upper and lower flanges; and a pressing unit disposed on a support base and detachably connected to said lower plate, said pressing unit having an axially extendable shaft, wherein said shaft, in an extended position, passes through said through hole in said lower plate and applies a pressing force to said lower mold assembly.

2. The tire vulcanizing apparatus as claimed in claim 1, further comprising a projection piece located on said lock ring and a lock ring rotation drive mechanism disposed on said support base and detachably engaged with said projection piece.

3. The tire vulcanizing apparatus as claimed in claim 1, further comprising an elastic assembly supporting said pressing unit on said support base.

4. The tire vulcanizing apparatus as claimed in claim 1, further comprising a spring assembly including a plurality of rods extending downwardly from said lower mold assembly, and a spring positioned on each said rod to bias said lower mold assembly away from said upper mold assembly.

5. A tire vulcanizing apparatus comprising:

an upper plate having an outer peripheral portion which terminates in an upper flange;

a transportable upper mold section mounted on a surface of said upper plate;

a lower plate having an outer peripheral portion which terminates in a lower flange;

a transportable lower mold assembly movably disposed on a surface of said lower plate;

a lock ring encompassing said upper flange and said lower flange, wherein said lock ring is rotatable relative to one of said upper and lower flanges, and is detachably engaged with the other of said upper and lower flanges;

a pressing unit disposed on a support base and detachably connected to said lower plate and being engagable with said lower mold assembly to move said lower mold assembly toward said upper mold section; and a drive unit operably connected to said pressing unit.

6. The tire vulcanizing apparatus as claimed in claim 5, wherein said pressing unit includes an extendable and retractable shaft which applies a pressing force to said lower mold assembly when in an extended position.

7. The tire vulcanizing apparatus as claimed in claim 5, further comprising a spring assembly including a plurality of rods extending downwardly from said lower mold assembly, and a spring positioned on each said rod to bias said lower mold assembly away from said upper mold assembly.

8. A transportable tire vulcanizing apparatus comprising:

an upper plate having an outer peripheral portion terminating in an upper flange;

an upper mold section disposed on said upper plate;

a lower plate having a peripheral portion terminating in a lower flange;

a lower mold section disposed on said lower plate;

a lock ring rotatably received on one of said upper and lower flanges and detachably engaged with the other of said upper and lower flanges; and a spring assembly biasing said lower mold section away from said lower plate.

9. The transportable tire vulcanizing apparatus as claimed in claim 8, wherein said spring assembly comprises a plurality of rods extending downwardly from said lower mold section, and a spring positioned on each of said rods to bias said lower mold section in a direction away from said lower plate.

\* \* \* \* \*